United States Patent [19]

Bardusk

[11] Patent Number: 5,377,185
[45] Date of Patent: Dec. 27, 1994

[54] MULTISITE RF SYSTEM WITH A CENTRALIZED TELEPHONE INTERCONNECT

[75] Inventor: Joelle D. D. Bardusk, Lynchburg, Va.

[73] Assignee: Ericsson GE Mobile Communications Inc., Lynchburg, Va.

[21] Appl. No.: 18,422

[22] Filed: Feb. 17, 1993

[51] Int. Cl.[5] ............................ H04J 3/02; H04Q 7/00
[52] U.S. Cl. ...................................... 370/54; 379/59; 379/63; 370/58.2; 370/60.1; 455/33.1
[58] Field of Search ............... 370/54, 85.11, 60, 58.1, 370/58.2, 58.3, 110.1, 60.1; 455/34.1, 33.1, 33.2, 54.1, 58, 31.1, 13.1; 379/220, 224, 242, 243, 244, 258, 296, 63, 59

[56] References Cited

U.S. PATENT DOCUMENTS

| | | | |
|---|---|---|---|
| 4,268,722 | 5/1981 | Little et al. | 379/63 |
| 4,654,867 | 3/1987 | Labedz et al. | 455/33.2 |
| 5,239,538 | 8/1993 | Teel et al. | 370/85.1 |
| 5,253,253 | 10/1993 | Brame et al. | 370/85.11 |

Primary Examiner—Douglas W. Olms
Assistant Examiner—Huy D. Vu
Attorney, Agent, or Firm—Nixon & Vanderhye

[57] ABSTRACT

A centralized telephone interconnect system for an RF multisite system. Multiple publicly trunked radio sites are networked together through a multisite switch. The centralized telephone interconnect system couples a series of land telephone lines to the multisite switch so that a mobile radio user anywhere in the multisite system is accessible to telephone communications. The telephone interconnect system supports individual calls, group calls and dispatcher console calls. The system includes a centralized interconnect controller that supervises the operation of the interconnect system and a telephone line switching network that connects telephone lines to the multisite switch. A centralized telephone interface module within the multisite switch connects to the centralized interconnect controller and switching network.

4 Claims, 25 Drawing Sheets

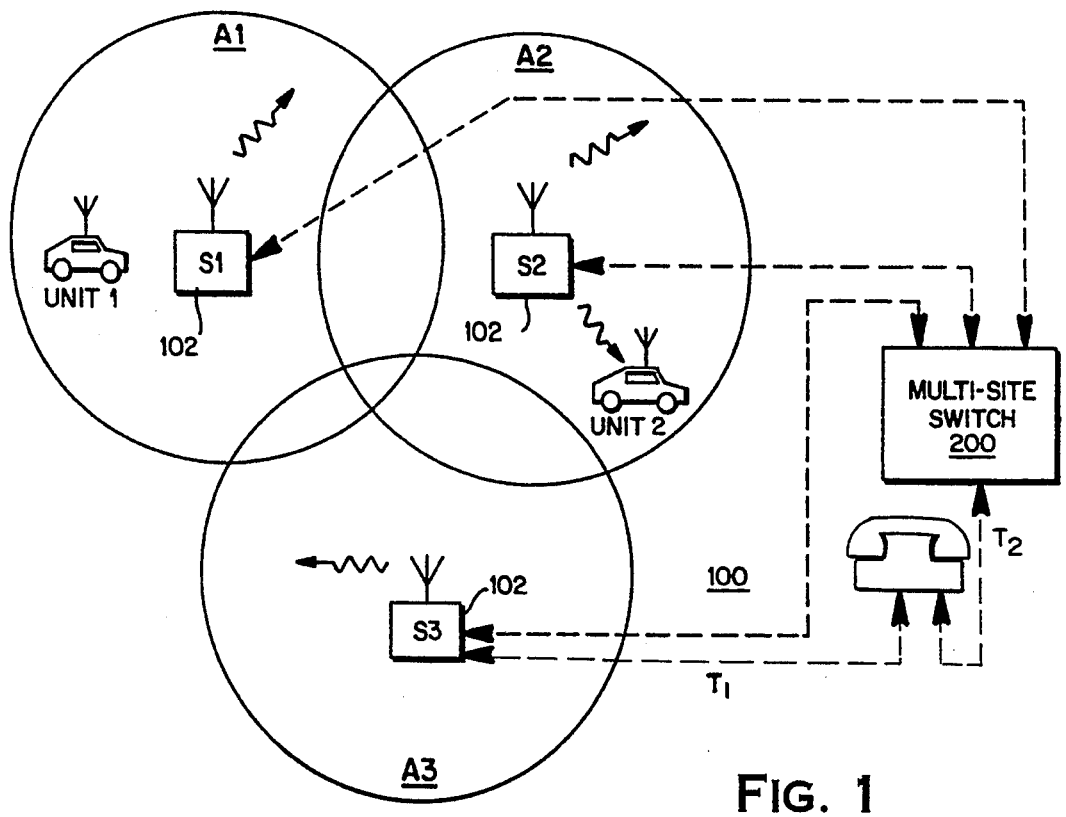
FIG. 1
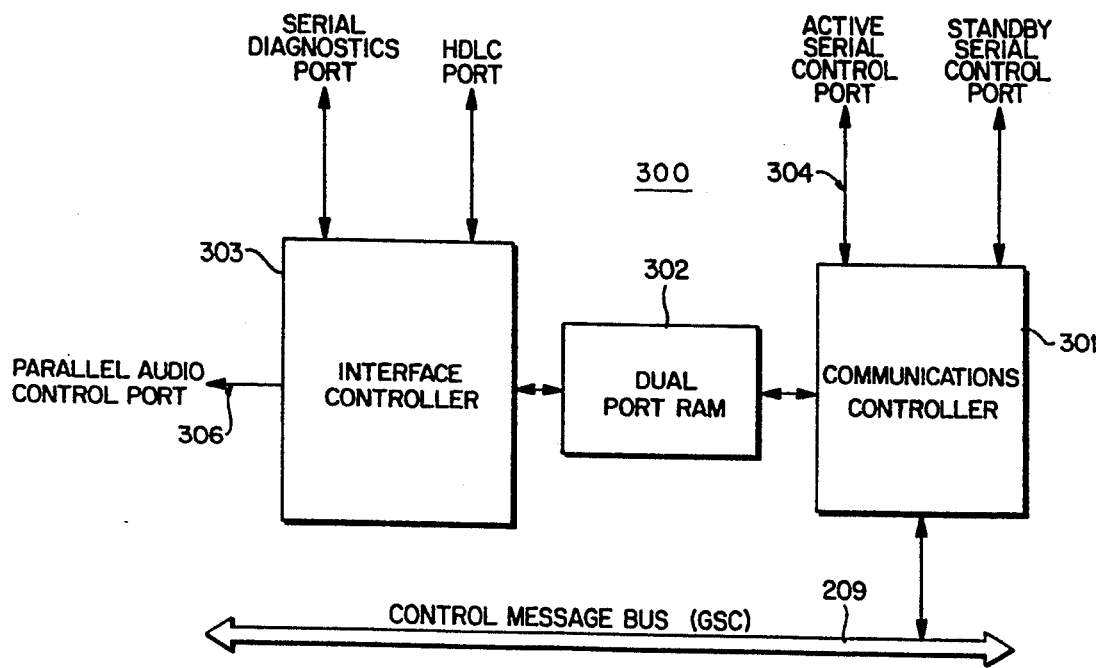
FIG. 3  SWITCH CONTROLLER CARD ARCHITECTURE

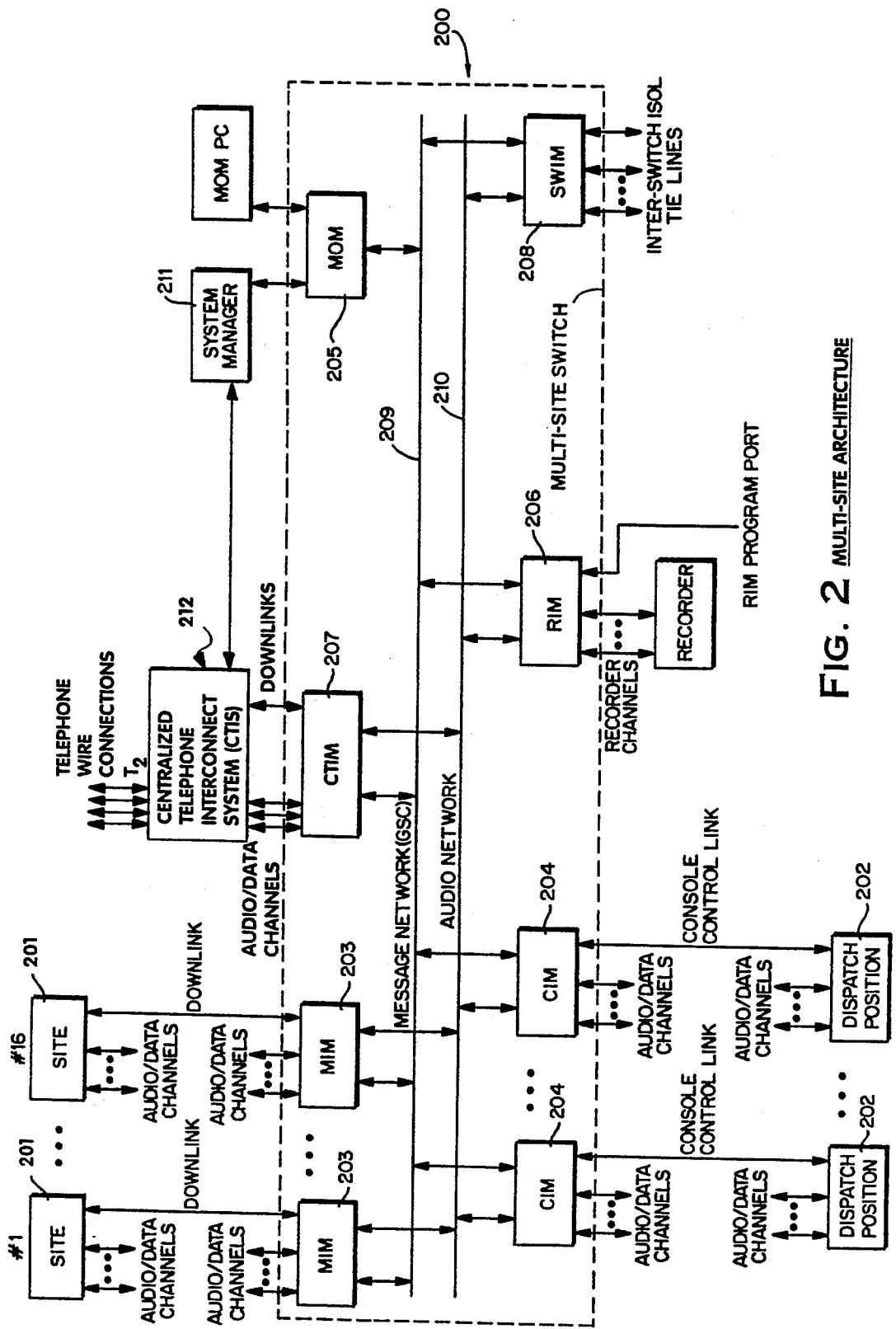
FIG. 2 MULTI-SITE ARCHITECTURE

MULTISITE RF SYSTEM WITH A CENTRALIZED TELEPHONE INTERCONNECT

RELATED APPLICATIONS

This application is related to the following copending commonly assigned U.S. patent applications.

Application Ser. No. 07/532,164, filed Jun. 5, 1990, entitled "Fail-Soft Architecture for Public Trunking System" now U.S. Pat. No. 5,175,866 issued Dec. 29, 1992.

Application Ser. No. 07/658,843, filed Feb. 22, 1991, entitled "Dynamic Address Allocation Within RF Trunking Multisite Switch" now U.S. Pat. No. 5,276,442 issued Jan. 4, 1994.

Application Ser. No. 07/658,640, filed Feb. 22, 1991, entitled "Bus Slot Update/Idle Control In RF Trunking Multisite Switch" now U.S. Pat. No. 5,253,253, issued Oct. 12, 1993.

Application Ser. No. 07/658,798, filed Feb. 22, 1991, entitled "Multisite Switch System Controller Architecture" now U.S. Pat. No. 5,239,538, issued Aug. 24, 1993.

Application Ser. No. 07/658,636, filed Feb. 22, 1991, entitled "Audio Routing Within Trunked Radio Frequency Multisite Switch".

The disclosure of each of these related copending applications is incorporated by reference.

FIELD OF THE INVENTION

This invention relates to interconnecting telephone communications with radio frequency (RF) signal multisite transmission systems. In particular, the invention, relates to a distributed network of trunked radio transmission sites in which command and audio signals from one site are switched through a distributed network to other transmission sites. This multi site network has the capability to interconnect telephone communications with radio communications anywhere in the RF transmission system.

BACKGROUND AND SUMMARY OF THE INVENTION

A need often arises to interconnect telephone communications with mobile radio systems. This is especially true for public service RF communications systems. There are numerous occasions when a police officer, fireman, taxi driver or other mobile radio user needs to place or receive a telephone call. For example, a police officer might telephone an informant to obtain information for a search warrant or before entering a crime scene. Similarly, a crime victim may call the police officer on patrol whom the victim previously talked to about a crime. A paramedic might telephone the parents of a child in an accident to obtain the child's medical history. Accordingly, it would facilitate these communications if the mobile radio user could place or receive telephone calls through the mobile radio.

Interconnecting radio and telephone systems has been complicated and expensive in the past. Previously, telephone connections with an RF system were placed manually through a central dispatcher or a mobile radio operator. Requiring a live operator to set up a telephone call is both expensive and time consuming. More modern RF systems have telephone interconnect hardware at individual site controllers and base stations. One example of a site based telephone connection is the EDACS ™ telephone interconnect system offered by the assignee of this invention.

This type of site based hardware is suitable for single site RF systems, but does not work well for multisite systems for several reasons. First, expensive electronic hardware is required at each site controller. A user cannot place a telephone call when he is within a site for which the controller lacks telephone connection hardware. Second, an incoming telephone call must be placed to the particular site having the callee. If the caller does not know the site in a multisite system that has the intended callee, then the caller cannot place the call. Third, a mobile radio callee or caller cannot move out of a site handling an ongoing telephone call without terminating the call. There are other disadvantages of having telephone connection hardware located at one or more individual site controllers without centralized control over telephone communications.

The present invention relates to an apparatus and method for connecting telephone lines to a multisite distribution switch for a network of several single site trunked radio systems. An example of a single site transceiver system is disclosed in commonly-assigned U.S. Pat. No. 4,905,302, entitled "Trunked Radio Repeater System" and U.S. Pat. No. 4,903,321 entitled "Radio Trunking Fault Detection System" which are incorporated by reference. Digital trunked radio transceivers capable of handling communications between numerous mobile units and dispatcher consoles in a single area are known.

Multiple transmitting sites are necessary to provide RF communications to all locations within many cities, towns, counties or other localities. For example, multiple transmitters may be needed to cover a rural community covering many square miles or a city having many buildings. FIG. 1 is a schematic diagram of a simplified multiple-site system having three radio repeater (transmitting) central sites S1, S2, and S3 providing communications to geographic areas A1, A2, and A3, respectively. Mobile or portable transceivers within area A1 receive signals transmitted by site S1, transceivers within area A2 receive signals transmitted by site S2, and transceivers within area A3 receive signals transmitted by site S3. Each site has a site controller that acts as a central point for communications in the site. To enable communications from one area to another, a switch connects the radio systems together as a united network to establish audio slots connecting one site controller to another. The caller and callee communicate through their respective interconnected site controllers. A mobile radio caller in one area can communicate with another mobile use in another site area.

In the present invention a telephone call may be made from or to a mobile radio any where in a multisite RF trunked repeater system. The multisite switch connects with a telephone system through a centralized telephone interconnect system (CTIS). Since the multisite switch links together a network of mobile radio systems a radio user in one area (e.g. A1) can communicate with a callee in another area (e.g. A2) or place a telephone call (e.g. T1) through the multisite switch. In addition, a telephone call can be grouped with other radio calls so that more than one radio user can participate in the telephone call. Moreover, existing telephone interconnect hardware at an individual site, e.g., $S_3$, can be used in conjunction with the telephone handling capacity of the CTIS at the multisite switch.

In multisite, the site controller (S1) receives a call from a mobile radio in A1 requesting a channel to communicate with a specific callee. A caller requests a channel simply by pressing the push-to-talk (PTT) button on his microphone. This informs the site controller that a channel is requested. The PTT signal is transmitted to the unit on a control channel that is continuously monitored by the site controller. The site controller assigns a channel to the call and instructs the caller's radio unit to switch from the control channel to the channel assigned to the call. This assigned channel is applicable only within the area covered by the site.

If the mobile unit is placing a telephone call, it sends a channel request for a telephone line to the site controller. The site controller will assign a working channel to the call and command the mobile radio to switch to the assigned working channel. In addition, the site controller will connect the assigned channel to a telephone line ($T_1$) if the controller has on a site telephone line connection.

To connect a call from one site to another site or to a centralized telephone connection, the site controller sends the channel assignment to the multisite network switch. The switch activates an internal audio slot for the call. The switch also sends a channel request to all CTIS and other site controllers or to only those site controllers having a designated callee within their site area. If a telephone connection is required, the telephone interconnect node (CTIS) of the multisite switch responds to the channel request message from the originating node by assigning a telephone line to the call and coupling the assigned line to the internal switch audio slot assigned to the call The call is transmitted to the originating site controller, routed through the assigned audio slot in the switch and retransmitted by the secondary sites on various assigned channels in those other areas and/or coupled into a telephone communication. For telephone calls, a second path is established from the telephone connection at the switch through a second audio slot in the switch, to the site controller and to the mobile user via the previously assigned site working channel.

When the caller ends the call, the originating site controller deactivates the assigned channel for that site and notifies the network switch that the call is terminated. There may be a brief "hang time" after the end of the call during which the channel remains assigned. During this hang time, the call can be rekeyed without going through the channel assignment procedure.

When the call is dropped, the telephone connection is broken. Similarly, the network switch sends an end of call command to the secondary site controllers. A call is terminated in a similar format and operation as the slot assignment. Instead of establishing an audio route between sites and through the switch, the drop call command causes the assigned channels to be released.

In addition to providing communications between mobile radio units in different areas, the multisite network switch provides communications between dispatchers and mobile radio units. The dispatcher consoles are connected to the network switch in the same manner as are the site controllers. A dispatcher console can issue a channel call request through the network switch to a site controller in another area to call a mobile unit or to another dispatcher console to call a dispatcher in another area.

In addition to all of the features that the mobile units have, each dispatcher console has the ability to participate in any call, including telephone calls, in its area or to its assigned groups. Thus, when a call comes through the network switch from another area or a telephone line to a mobile radio, the network switch informs the dispatcher console of the call in addition to notifying the site controller. The dispatcher can listen in or participate in the call.

The network switch is also capable of handling calls to groups of mobile units and/or dispatcher consoles. The wide area switch manages group calls and monitors the network to ensure that the site controllers for all of the callees in the group assign a channel to the group call. If a channel is not assigned, the wide area switch advises the caller that the wide area call cannot be formed as requested. The caller then has the option of re-keying the call so as to reach those areas having assigned channels.

The multisite switch maintains site and track masks in its databases to identify and locate the site having each unit and group in the entire radio system covered by the multisite switch. Thus, a telephone caller need only know the telephone number for the multisite switch and an identifier number for the callee's mobile radio unit. The multisite switch then routes the telephone call to the particular site having the callee.

A database site mask is maintained for each radio unit in the multisite system and each group of units. A track mask is also maintained for each user and group in the system. The site masks are static and are stored in a system manager for the system. The site mask must be up-loaded from the system manager to appropriate nodes in the switch when a call is initially placed. The track mask is dynamic and is continuously updated by log-ins and call activity from the units in the various sites.

In the preferred embodiment, each mask is a 16-bit field. Each bit corresponds to a particular site. A one (1) bit signifies that this site should be involved in calls to the group or individual associated with the mask. A group can have multiple bits set in its site and track masks because there may be group members spread over several sites. An individual may have multiple bits set in his site mask but only one bit set in his track mask. An individual can be in only one site at a time. Accordingly, the track mask should only have one bit set at a time. By use of these masks, the multisite switch can determine which sites should participate in a call and which sites have certain units and group members. Using this information, the switch can route audio to the appropriate sites.

The present invention relates to a multisite switch having a distributed architecture. The logical functions of the switch are shared by various microprocessor operated nodes distributed throughout the switch. The nodes share the computational workload of the switch. Each node is connected to a site controller, dispatcher console, the system manager or other component of the overall radio system. The nodes coupled to site controllers are referred to as Master II Interface Modules (MIMs) and the nodes coupled to dispatcher consoles are referred to as Console Interface Modules (CIMs).

Each node of a multisite network switch is supported by a switch controller card operated by microprocessors. All of the cards have substantially the same hardware and are interchangeable. The MIM and CIM cards have identical hardware. There is one card for each site controller and each dispatcher console coupled to the switch. Each card acts as a gateway into the network for its site controller or dispatcher console.

The multisite switch does not completely fail if one network node card breaks down. Wide area communications, i.e. calls between site areas, continue despite the failure of a node. If a card fails, then the gateway to the network is closed only for its site controller or dispatcher console. Failure of a node prevents wide area communications only with respect to the site or console connected to the failed node. Mobile units in the area serviced by the failed card will not be able to call a unit in another area or receive calls from another area.

Local communications within an area are not disabled by the failure in the multi site switch. A site controller is not disabled by a failure of its associated node in the multisite switch. In particular, the failure of a MIM does not disable the site controller to which the MIM is connected. The site controller continues to operate and local communications within the area are unaffected by a failure in the multisite switch.

The ability to continue wide area calls after a node in the switch has failed provides several advantages to a distributed architecture switch over a central architecture switch. In a central architecture, a central processing unit (CPU) governs the operation of the switch. If this CPU fails, then the entire switch fails. Wide area communications are completely shut down by the failure of a multisite switch having a central architecture. As already stated, wide area communications are not completely shut down by a failure in a switch having a distributed architecture.

BRIEF DESCRIPTION OF THE DRAWINGS

FIG. 1 is an illustration of three site radio system networked together by a multisite switch coupled to telephone lines;

FIG. 2 is a schematic of the architecture for a distributed network multisite;

FIG. 3 is a block diagram of a switch controller card for the centralized telephone interface module (CTIM) and other multisite switch nodes;

DETAILED DESCRIPTION OF THE DRAWINGS

Figure 4:
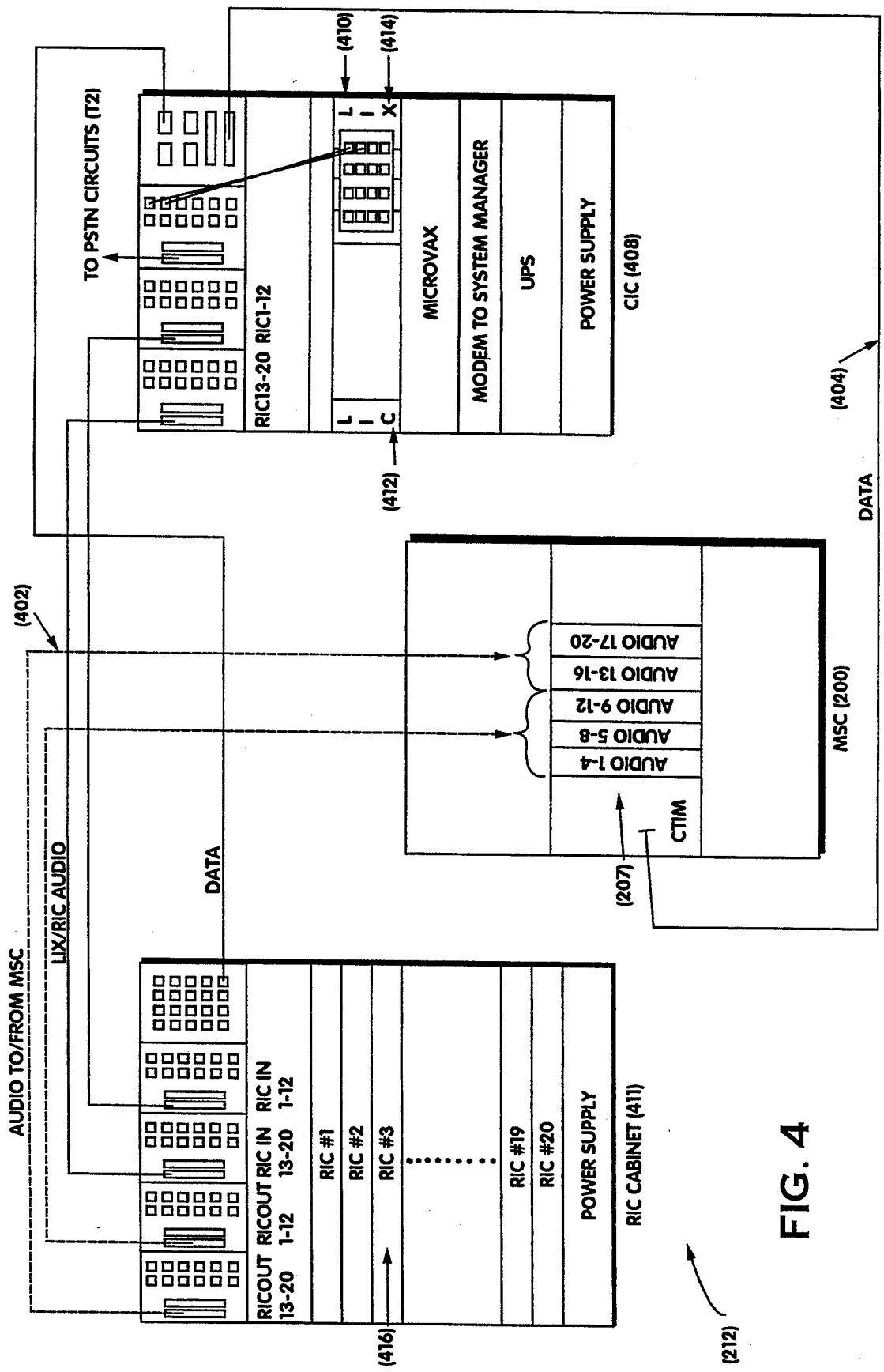
FIG. 4 is a block diagram of a centralized telephone interconnect system (CTIS)

An exemplary trunked radio repeater system in accordance with the invention is generally depicted in FIG. 1. Individual remote units (UNIT 1+2) communicate with each other through shared radio repeaters that are part of the trunked repeater system 100. The system is composed of several sites 102. Each site includes a site transceiver that broadcasts signals over a certain area and a site controller. For example, site $S_1$ broadcasts over area $A_1$. The remote units communicate with units within their own area or with units in other areas. The remote units also communicate with the dispatcher console for each site.

Each site is optionally controlled by a site controller. The site controller controls much of the data and audio traffic in its area. The site controller is described in more detail in the application and patents previously mentioned. Some sites ($S_3$) include hardware to support local (within the site area $A_3$) telephone communications $T_1$. In addition, the site controller communicates with the multisite switch 200. The multisite switch handles communications between sites and telephone communications $T_2$ to and from the network of sites.

I. MULTISITE SWITCH

Communications between sites are conducted through the multisite switch 200 shown in FIG. 2. The multisite switch communicates with each of the site controllers 201 or the downlink GETC in basic sites in every site and the dispatcher consoles 202. There are both data and audio communication lines between the multisite switch and each site controller and dispatcher console.

The multisite switch is also connected to a plurality of telephone lines $T_2$ via a centralized telephone interconnect system (CTIS) 212. The switch receives telephone calls from outside of the RF system and routes those calls to the appropriate radio user within the system. Similarly, requests for a telephone line placed by a radio user are acted on by the multisite switch which provides the user access to a telephone line. If the user is in a site ($S_3$) with local access (ST) to telephone lines, then the call may be routed by the site to a telephone line without going through the multisite switch.

The primary responsibility of the multisite switch is to establish and remove audio connections among the audio channels (both RF and telephone wire) connected to it. The multisite switch comprises a local area network of nodes. As shown in FIG. 2, the nodes are labelled corresponding to whether they interface with a site controller (each site controller has a downlink trunking card (GETC) that couples to the multisite switch) dispatcher console), telephone line connection or other system component. For example, the Centralized Telephone Interface Module (CTIM) 207 couples the multisite switch to the CTIS 212. The CTIS manages Repeater Interconnect Controllers (RIC) (Twenty RICs in the preferred embodiment) that can each handle a separate telephone connection to the multisite switch. Similarly, MIMs 203 are nodes in the switch that interface with sites and CIMs 204 are nodes that interface with dispatcher consoles. There are other nodes such as a Monitor Module (MOM) 205, and a Recorder Interface Module (RIM) 206 and Switch Interconnect Module (SWIM) 208 that interfaces the switch with certain telephone lines.

The MOM 205 is the interface for the system manager and the MOM PC (personal computer). The system manager updates the databases in all of the nodes. The MOM maintains certain centralized databases including databases for smart calls and confirmed calls. Smart calls relate to the operation of the dispatcher console. A call is "smart" if the call has been selected so as to be listened to by a dispatcher via a select speaker in the console. If the call is not selected by at least one console, then flashing indicator lights appear on certain consoles. This light alerts several dispatchers that a call is not being monitored by at least one dispatcher.

The RIM 206 interfaces recorders to the switch. Recorders are assigned to record calls for various groups or units.

Each node in the multisite switch is supported by a microprocessor controlled communications card. All of the cards for the MIMs, CIMs, CTIM, MOM and RIM and SWIM have the same hardware and are interchangeable. The cards are said to have different personalities to indicate that they are assigned to, for example, a site controller or a dispatcher console (dispatch position). Each card can be easily configured to be a CTIM, MIM, CIM, etc., by setting a few switches on the card. Thus, the cards are interchangeable.

The nodes of the switch are each connected to a digital message bus 209 and a digital audio bus 10. The message bus 209 is shown in FIG. 2 as a message network using an Intel 80C152 Global Serial Channel (GSC) microprocessor. The message network is a high speed data bus that resides in the GSC microprocessor.

The audio bus 210, in the present embodiment, comprises 32 time division multiplexed buses. Each bus contains 32 slots that each carry a single audio channel. A maximum of 1024 audio slots may be routed through the switch (32 buses×32 slots). The audio slots are assigned by the MOM to specific nodes, e.g., MIMs and CIMs, when the switch is enabled.

As part of the switch start up procedure, the nodes connect their assigned bus/slots to the node's external channel inputs. For example, a CTIM will couple each RIC channel from each RIC in the CTIS to a separate audio bus/slot in the multisite switch. Once the bus/slot is linked to the RIC channel, the bus/slot constantly receives the output from the RIC channel through the CTIM. The RIC channel carries no intelligible signal until it is assigned to a call by the CTIS. Although a bus/slot is linked to a single RIC for purposes of transmission of an incoming telephone call, no other node in the multisite is listening to that particular bus/slot until the CTIM sends a slot assignment message on the message network 209 throughout the switch notifying the CIMs and MIMs that a telephone call has been assigned to that bus/slot. Those MIMs and CIMs having the intended callee(s) will connect to the bus/slot carrying the call and pass the audio to the callee.

FIG. 3 shows a block diagram of the controller card 300. This diagram is applicable to all of the nodes of the switch including the CTIM. The controller hardware for the MIM, CTIM, MOM, SMIM, RIM and CIM is a switch controller card. Each controller card includes a communications controller 301, a dual port random-access-memory (RAM) chip (302) and an interface processor 303.

The communications controller 301 is a message router. It routes messages between the control message bus 209, the serial port (downlink) leading outside of the switch 304 to the CTIS in the case of the CTIM, the message bus and the interface processor 303 through the dual port RAM 302. In the present embodiment, the communications controller is an Intel 80C152 microprocessor. The communications controller is coupled to the message bus 209 that interconnects all nodes in the multisite switch 200. This controller 301 places messages onto the bus and receives messages from the message bus. Messages received from the CIC over the serial port are translated by the communications controller into a format usable by the multisite switch. The communications controller also translates switch messages into a format that the CIC understands.

The interface processor 303 performs substantially all of the logical functions for the controller card for each node of the multisite switch. The interface processor provides the intelligence for the card. The interface processor, in the preferred embodiment, is an Intel 80C186 microprocessor. The interface processor acts as a switch for the audio network and assigns slots to active audio channels through the parallel audio control port 306.

Each call through the multisite switch is patched to a slot on a particular audio bus within the switch. When a call is terminated, the bus/slot assignment is terminated and the slot is made available for assignment to another call. The interface processor for each MIM and the CTIM assigns slots, connects audio slots to the site controller or dispatcher console to establish a communications link, and terminates calls. Since the CTIM and all MIMs and CIMs perform these functions, they must continually inform each other and the other nodes of their slot assignments. Accordingly, the CTIM, MIMs and CIMs send repeated messages regarding slot assignments, slot updates and slot idles over the message network 209 to other nodes. In this way, the status of each node and each slot in each audio bus is continually updated throughout the multisite switch.

The communications controller 301 for each node initially processes all of the messages on the message network. Slot assignments are forwarded to the interface processor through the dual port RAM 302. Redundant slot update/slot idle messages are not forwarded to the interface processor by its communications controller. Messages regarding slot updates or idle slot control are processed by the communications controller by referring to a bit map located in the RAM storage 302. Update messages are sent periodically by a primary MIM to confirm to the other nodes the active status of a slot. When a primary MIM terminates a call it sends a slot idle message to the other nodes. The primary MIM also periodically sends update idle messages until the slot is reassigned to another call.

The slot bit map in the dual-port-RAM 302 identifies the status of each audio slot on all 32 buses. The bit map is updated by slot assignment messages, slot idle messages and slot updates that are sent on the message bus. Slot assignment messages inform all nodes of the bus and slot number hosting the call. A more complete disclosure of the slot bit map and slot status messages is contained in U.S. Pat. No. 5,233,253 identified above.

The multisite switch tracks each user in the RF network, including mobile users that travel from site-to-site. Each MIM maintains databases that identify the mobile units within its site and the unit groups that correspond to active calls. These databases are set up by the system manager 211 and sent to all of the switch nodes. The unit database identifies each unit in the wide area system. For each MIM, some of the units will be in its assigned site area and others will be outside of its area. The MIM tracks the units in its area.

Each unit may be capable of participating in several different groups and the unit operator selects the desired group at any particular time. Whenever a call comes in for the selected group, then the unit will receive the call. The MIMs also maintain a database of the groups. A group is a collection of units that communicate together on a single call. For example, there may be a group for the fire department that allows all of the fire trucks to listen to the central dispatcher or the fire chief. The dispatcher dials this group into his console to broadcast messages to all fire trucks. Similarly, groups can be established of rescue stations, police units assigned to a particular precinct, and many other combinations of users of the public service radio system.

The unit databases are continually updated by each MIM. The databases are also updated from time to time by the system manager operator. The unit databases on each MIM contain the same information with the exception of the "on this site" bits. These bits are set only if the corresponding unit is in the area serviced by the MIM and are, thus, unique to each MIM. With the exception of the "on this site" bits, the unit databases are set by the system manager.

The "on this site" bits in the unit are set and reset during the login procedure followed by each radio unit as it moves from one site area to another. Each site broadcasts a control channel throughout the area covered by the site. Every radio unit in the area is locked onto this control channel. When a unit leaves an area and loses reception of the control channel, the radio scans for another control channel. The scanner will lock onto the control channel being broadcast in the area that the unit has moved into. When the unit locks onto this other control channel, the unit transmits a login signal to the site controller which in "turn sends the login signal to its MIM. The login identifies the unit and its current group. The MIM receives the login signal and then switches the "on this site" bits for the database entries for that unit. In addition, the MIM places a signal on the message bus identifying the unit that logged into that site. All of the other MIMs monitor the message bus and check whether the message identifies a unit previously in their areas. The one MIM that load the unit, reads the login unit from the message bus and logs the unit out by resetting the "on this site" bits for its unit entry in the unit database.

The MIM communicates with the site controllers using the message format and protocol of the site controller. Descriptions of the commands employed by the site controller are contained in the commonly assigned patents and co-pending applications referred to elsewhere in this specification. In particular, U.S. Pat. No. 4,835,731, entitled "Processor-To-Processor Communications Protocol For A Public Service Trunking System", sets forth many commands for a public service trunking system.

II. CENTRALIZED TELEPHONE INTERCONNECT SYSTEM

The CTIM is coupled to the CIC through one or more standard serial land line (e.g. a telephone line). The CTIM receives digital command signals from the CTIS through a down link line such as is described in commonly assigned U.S. Pat. No. 4,835,731, previously cited and incorporated by reference.

FIG. 4 is a block diagram of the centralized telephone interconnect system (CTIS) 212. The CTIS connects to a CTIM 207 via a series of audio path links 402 and a serial data link 404. These links are the same as the links between a MIM in the multisite switch 200 and a site controller. Moreover, these links are described in detail in U.S. Pat. No. 5,239,238 and in Ser. No. 07/658,636 entitled "Audio Routing Within Trunked Radio Frequency Multisite Switch."

The CTIS consists of a centralized interconnect controller (CIC) 408 which includes an audio routing switching center 410, and a Radio Interface Controller (RIC) cabinet 411. The CIC is a computer controller and in the preferred embodiment is a standard microVAX identical to current site controllers sold by Ericsson GE Mobile Communications, Inc. of Lynchburg, Va. The CIC is similar in function to the site controllers described in U.S. Pat. No. 5,175,866. There are some minor inconsequential differences between the operation of the CIC and a site controller because the CIC supervises a telephone switch audio router and a site controller supervises RF repeaters.

The audio routing switching center 410 consists of a series of line interconnect controllers (LIC) 412, and line interconnect crossbars (LIX) 414, and the RIC cabinet consists of repeater interconnect controllers (RIC) 416. The LIXs each directly connect one of the telephone lines T2 to the CTIS. Some of these telephone lines may be dedicated to an individual mobile radio user or group of users. The operation of each LIX is similar to a standard modem. The LIXs are conventional and have been used in the EDACS (tm) system referenced above and sold by the assignee. The LIC links the audio from each individual LIX to a particular RIC in the switching center. The selection of a particular LIX and RIC is made by the CIC which issues a command to the LIC instructing it which LIX and RIC to interconnect. Each RIC has a dedicated audio line to an audio path in the CTIM.

III. SET-UP AND ROUTING MESSAGES FOR CTIS AND MULTISITE SWITCH INTERFACE

The control message and audio routing sequences for telephone calls in and out of the multisite RF system through the CTIS fall into four types of calls as follows: (1) individual interconnect calls in which a telephone call is placed through the CTIS for connection to an individual mobile unit; (2) outbound individual interconnect calls where an individual mobile unit places a telephone call through the multisite switch and the CTIS; (3) inbound group interconnect calls where an inbound telephone call calls a group of mobile users, and (4) outbound dispatch interconnect calls where a dispatcher places a telephone call through the multisite switch and CITS. Each of these types of calls requires a different sequences of messages and audio routing between the CTIS and the multisite switch as is described below.

A. Inbound Individual Interconnect Calls

An inbound individual interconnect call is made from a phone line to an individual mobile radio user whose radio has a specific identification number. In general, the telephone caller calls the CTIS and, upon receiving a dial tone, keys in a digital signal or DTMF tone identifying a particular radio unit in the multisite system. Alternatively, the particular radio unit may be unique to a dedicated telephone line and, thus, calling that line inherently identifies the callee radio user.

The CTIS notifies the multisite switch that it has made a channel assignment for the phone call and that the call is for a particular radio unit. The multisite switch distributes this information to all nodes in the switch. The MIMs in the multisite switch receiving these messages determine whether the designated radio unit is within their site. The MIM having the designated radio unit notifies its respective site controller which assigns a working channel for the call. The MIM couples the site working channel to the slot/bus in the audio bus of the multisite switch that carries the audio signal from the CTIS.

The operation internal to the multisite switch in connecting a telephone call is generally similar to routing an RF call from a dispatcher or mobile unit to another site. However, the messaging and audio routing between the CTIS and multisite switch is unique. In general, the messaging and audio routing between the multisite switch and CTIS for an inbound individual interconnect call has sequences for origination, radio key, radio unkey, land line (telephone line) drop, radio drop and radio originator drop.

Figure 5:
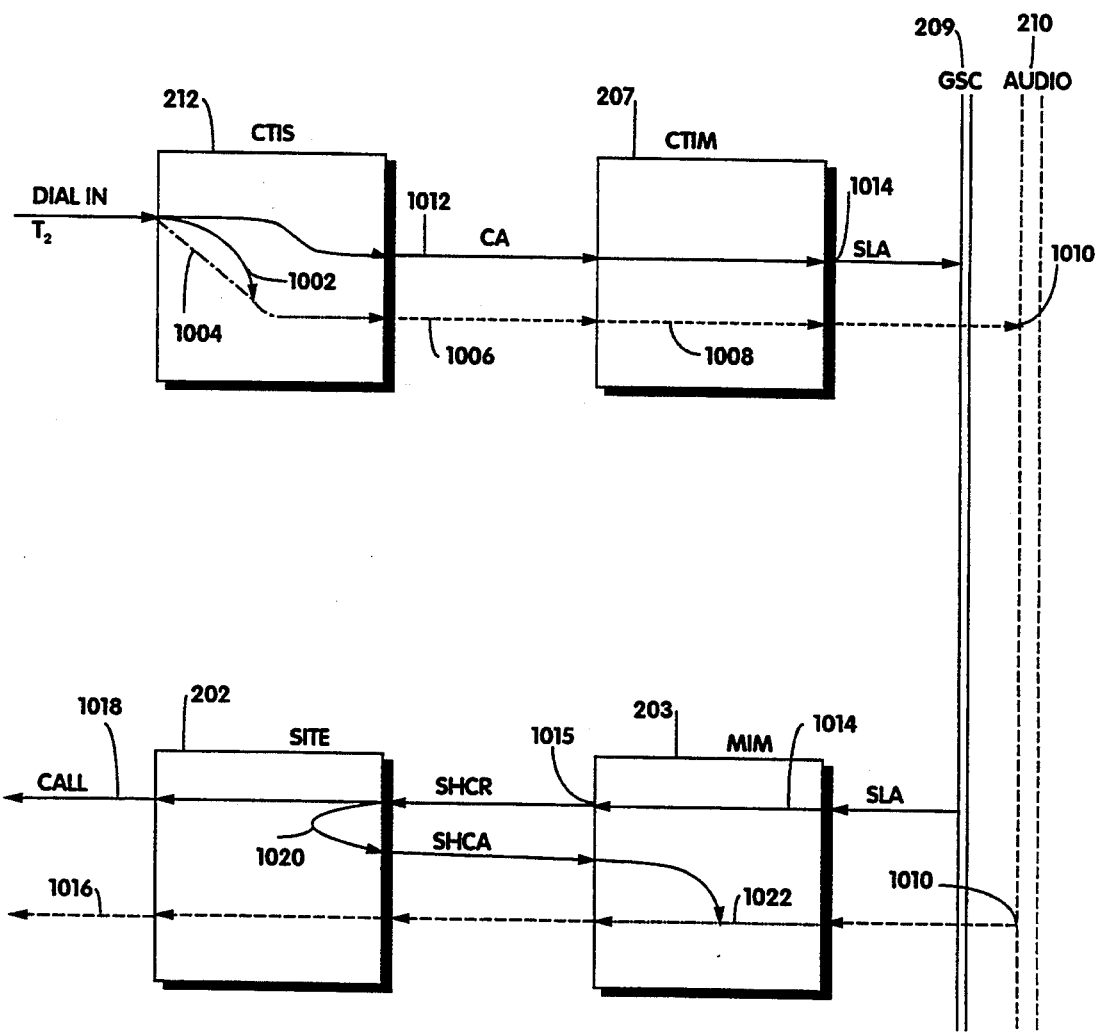
FIGS. 5 to 26 are flow diagrams of the audio routing and message sequencing for telephone connections to the multisite switch.

FIG. 5 shows the origination sequence for an inbound individual interconnect call to a mobile radio user. A telephone call $T_2$ is made on one of the phone lines connected to the CTIS 212. The logical I.D. for the particular radio unit being telephoned is either implicit to the call (where there is a dedicated telephone line to the CTIS for that particular radio unit) or is explicitly entered through digital messaging or DTMF tones by the telephoning caller. The CTIS establishes a connection 1002 between the line interconnect and crossbar (LIX) coupled to the telephone line, and one of the CTIS repeater interconnect controllers (RIC) 1004 to the CTIM. The selected RIC has a dedicated audio path 1006 to the CTIM 207. Similarly, the CTIM establishes a dedicated pathway 1008 between the audio path 1006 from the designated RIC to the particular slot/bus 1010 in the audio bus 210 of the multisite switch assigned to path 1006. When an audio signal is placed on pathway 1006, 1008, that audio signal is automatically routed to bus/slot 1010.

In addition to routing the audio signal, the CTIS sends a channel assignment (CA) message 1012 informing the CTIM that an active audio call has been placed on a particular RIC. In response to the channel assignment, the CTIM establishes audio pathway 1008 and generates a slot assignment (SLA) message 1014 broadcast on the switch message bus 209 to inform all MIMs that a particular bus/slot 1010 has an active call addressed to a particular callee and that the caller is from a telephone line. In the preferred embodiment, the caller I.D. for the CTIS, and hence telephone calls, is always a particular I.D. designation.

The CTIM does not connect the audio path 1008 to the bus/slot 1010 in response to the channel assignment from the CTIS. This audio path connect was previously set up between each particular RIC when the multisite switch was initialized. The connections between the audio bus and CTIM, MIMs and CIMs are continually open, but have no intelligible audio signal unless a call is assigned to the connection.

The slot assignment message 1014 broadcast is received by all MIMs in the multisite switch. Each MIM compares the caller I.D. designation in the slot assignment message to its bit map of active mobile radio units in its site. If the MIM 203 has the callee in its site corresponding to the caller I.D. in the slot assignment message, the MIM will forward the slot assignment message 1014 to the site controller 202 with a secondary channel (SHCR) message 1015. The site controller assigns a working channel 1016 to the telephone call and broadcasts on its control channel a call message 1018 to cause intended mobile radio to switch to the working channel to listen to establish an audio path for the telephone call.

In addition, the site sends a secondary channel assignment (SHCA) message 1020 to the MIM to cause the MIM to route 1022 the audio of the telephone call from the multisite switch to the particular audio pathway corresponding to the assigned channel 1016. In general, the MIMs establish audio links between the site and switch only in response to messages from the site. This ensures that the site is ready when paths are established.

Figure 6:
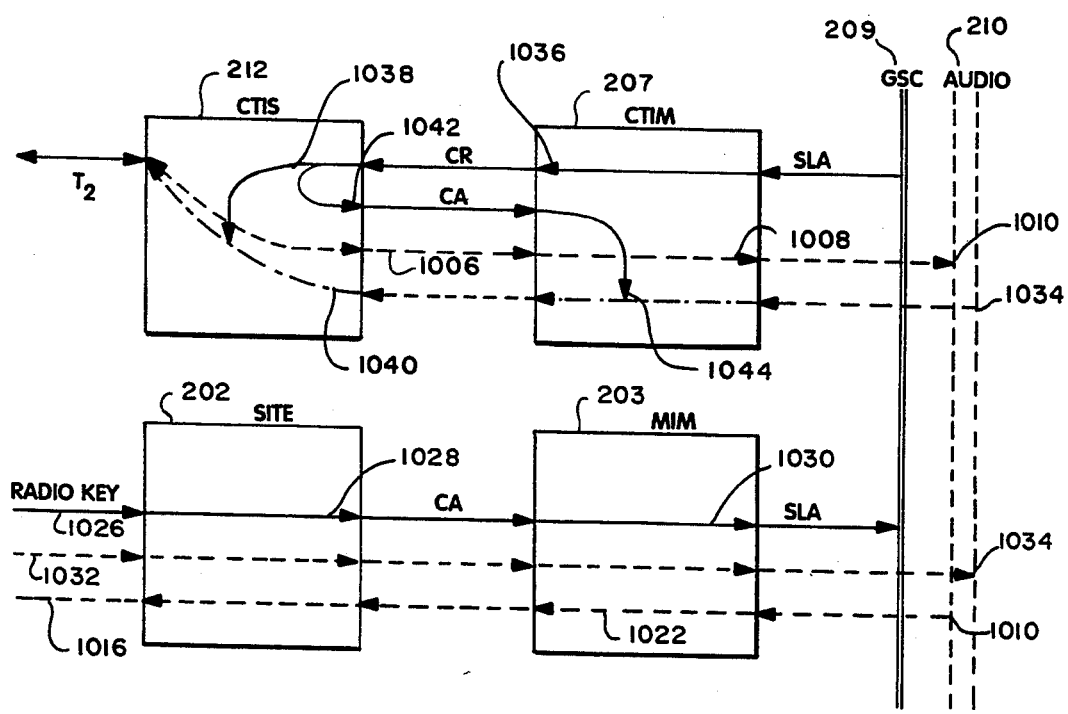

FIG. 6 shows the sequence for a radio keyed response from the mobile unit back to the inbound individual interconnect call. The mobile unit participating in the telephone call keys the radio, e.g., depresses the push-to-talk (PTT) switch 1026, to talk in response to the telephone call. The site 202 sends a channel assignment (CA) message 1028 to the MIM. The MIM generates a slot assignment (SLA) message 1030 broadcasted on the message bus 209. Interconnect calls are message trunked so it is not necessary for the site controller to assign a working channel to the mobile radio user every time the user depresses the push-to-talk button (PTT). Instead a secondary assignment message is sent to facilitate establishing the correct audio path. The secondary channel assignment message from the site informs the MIM that the radio user is on the channel and in turn the MIM places the audio signal on the bus/slot 1034 of the audio bus 210. The slot assignment message 1030 is addressed to the CTIMs. Upon receiving the slot assignment message, the CTIM sends a secondary channel request (CR) 1036 to the CTIS to cause the CTIS to assign 1038 a second audio pathway 1040 to the telephone call for audio from the mobile radio. The CTIS also sends a channel assignment message 1042 back to the CTIM advising the CTIM that the second path has been assigned to the telephone call. The CTIM connects 1044 the audio bus/slot 1034 to the audio pathway corresponding to the second assigned path 1040. As long as the radio remains keyed, the mobile radio user can speak to the telephone caller.

Figure 7:
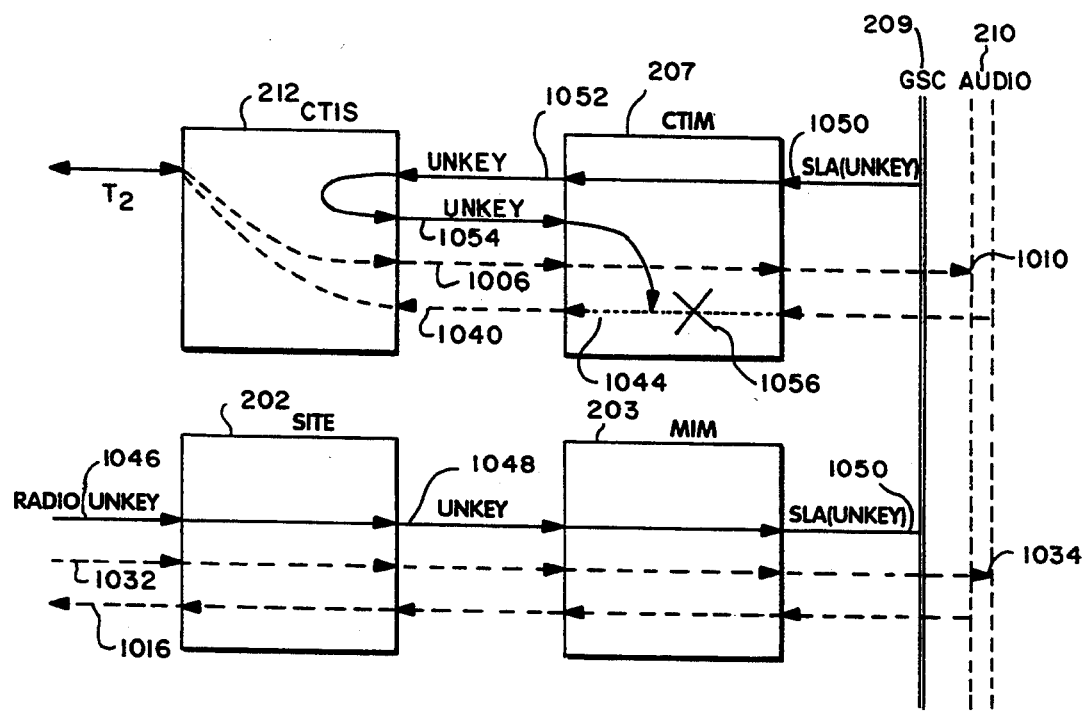

As shown in FIG. 7, when the mobile radio unit user unkeys after talking to an inbound individual telephone interconnect call, the audio pathway from the mobile radio unit to the telephone line is broken by the CTIM. When the radio user is finished talking, he unkeys his radio 1046. The site 202 then sends an unkey message 1048 to the MIM 203. In response, the MIM generates a slot assignment (SLA (UNKEY)) message 1050 addressed to the CTIM and informing it that the radio has unkeyed. In response to the slot assignment message, the CTIM 207 forwards an unkey message 105.2 to the CTIS. After a hang time expires or upon receiving a DTMF "#"tone from the phone user, the CTIS sends a drop message 1054 back to the CTIM. If a second key message (channel request 1036) is received during this hang time, the CTIS will not send a drop message back to the CTIM, but will rather leave the audio pathway 1040 open for the rekeyed call. If the hang time expires before a second key message is received, the CTIS will send a drop message 1054 to the CTIM. Only in response to a drop message from the CTIS or from the radio does the CTIM disconnect 1056 and establish audio pathway from the multi site audio bus 210 to the CTIS.

Figure 8:
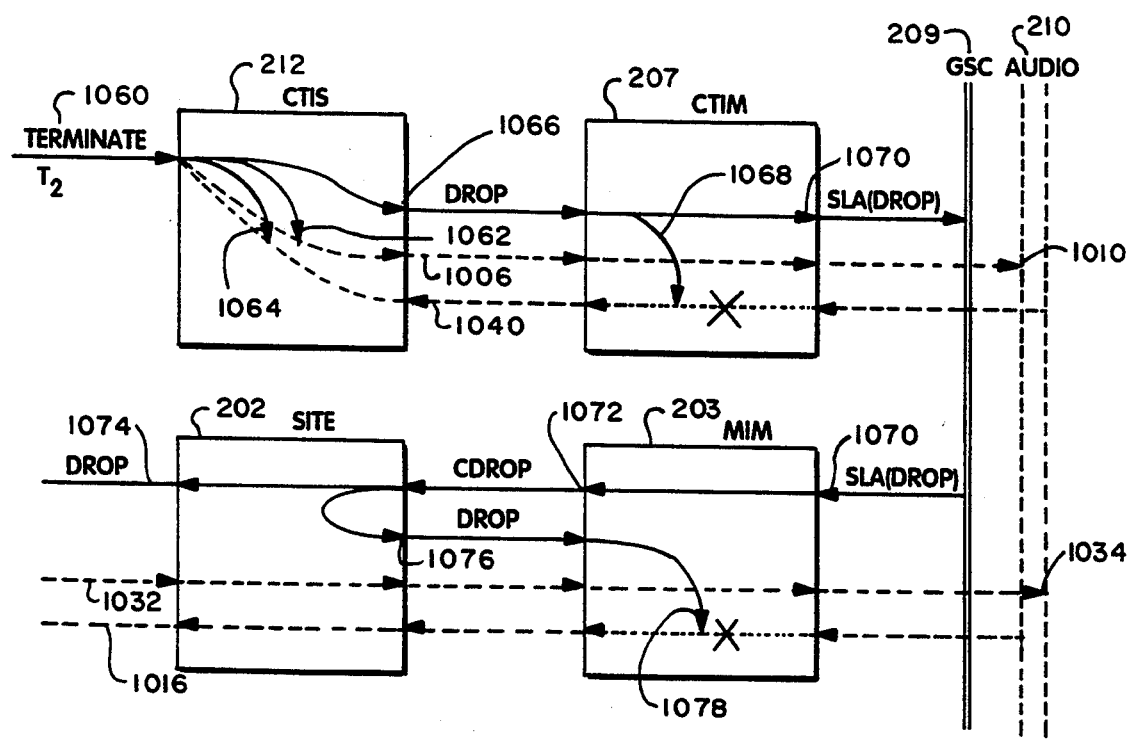

FIG. 8 shows the messaging and audio routing sequences that occur when the telephone calling party terminates a call, i.e., hangs up, 1060. When the telephone line $T_2$ is disconnected, the CTIS 212 disconnects its links 1062, 1064 to the land line $T_2$. In addition, the CTIS sends a drop message 1066 to the CTIM which in turn disconnects 1068 its connection to the bus/slot 1034.

In addition, the CTIM broadcasts a slot assignment (SLA (DROP)) message 1070 in response to the drop message from the CTIS over the message bus 209 to inform the MIMs that the audio signal from the land line (on bus/slot 1010) has been terminated. In response to this slot assignment message, the MIM involved with the call generates a callee based drop (CDROP) message 1072 sent to the site. In response, the site notifies the mobile radio of the drop so that the radio can return the site's control channel. In addition, the site sends a drop message 1076 back to the MIM so that the MIM can disconnect 1078 from the bus/slot 1010. In addition, the MIM updates its internal data bases to indicate that the call is inactive.

Figure 9:
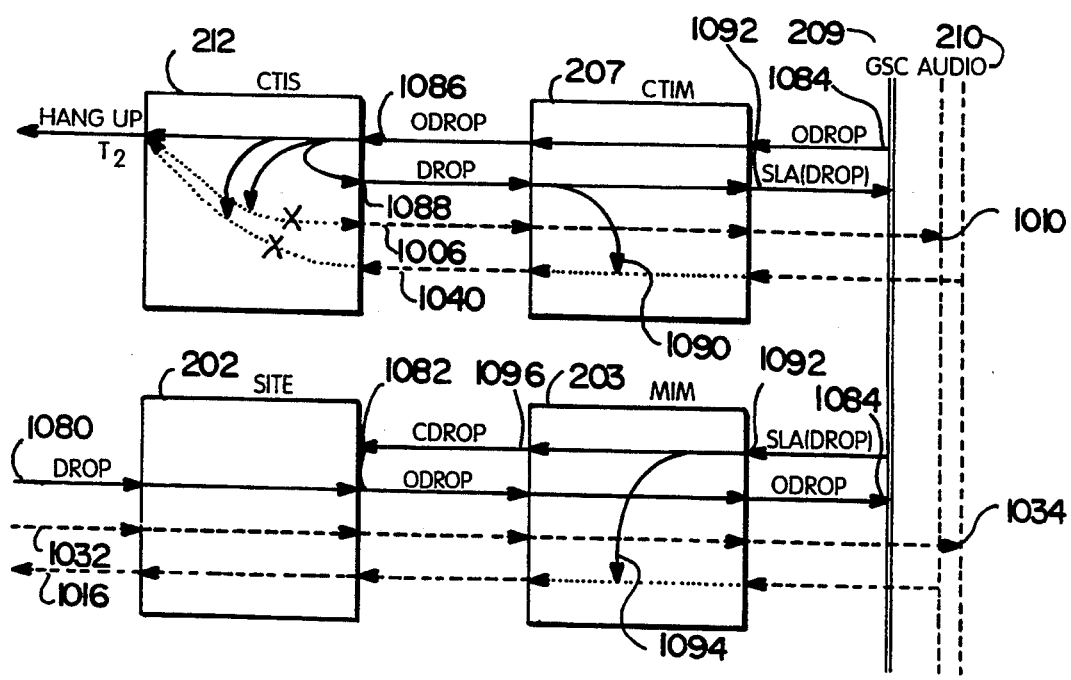

FIG. 9 shows the sequence when the radio callee terminates, in contrast to unkeying, an inbound individual telephone call from a callee. When the radio user sends a drop signal 1080 to the site 202, the site sends in originator drop (ODROP) 1082 message to the MIM. In response, the MIM broadcasts all originator drop message (ODROP) 1084 on the message bus 209. An originator drop message is generated, even though the radio user and MIMs are non-originating call units and node, respectively, because the call is no longer viable when the callee terminates the telephone call.

The ODROP 1084 message is forwarded by the CTIM to the CTIS as originator drop message 1086. In response, the CTIS disconnects both of its audio links between the telephone line $T_2$ and the inbound and outbound audio lines 1006, 1040. In addition, the CTIS returns a drop signal 1088 to the CTIM causing the CTIM to disconnect 1090 its link to the bus/slot 1034. In addition, the CTIM generates a slot assignment (SLA (DROP)) message 1092 in response to the drop message from the CTIS. The slot assignment informs all MIMs that the telephone call through the CTIS has been dropped. The MIM disconnects 1094 from the bus/slot 1010 allocated by the CTIM for the call, and the MIM sends a callee based DROP (CDROP) message 1096 to the site. The CDROP message informs the site that the telephone call which the site had routed to its radio user has been dropped. The MIM updates its databases, if it has not already done so.

B. Outbound Individual Interconnect Call

From Mobile Radio Unit to Telephone Line

When a mobile radio unit desires to make a telephone call, the radio user places an outbound individual interconnect call. The messaging and audio routing sequences required to establish and terminate outbound interconnect calls are: origination, radio key, radio unkey, land line (telephone) drop, land line originator drop, and radio drop.

Figure 10:
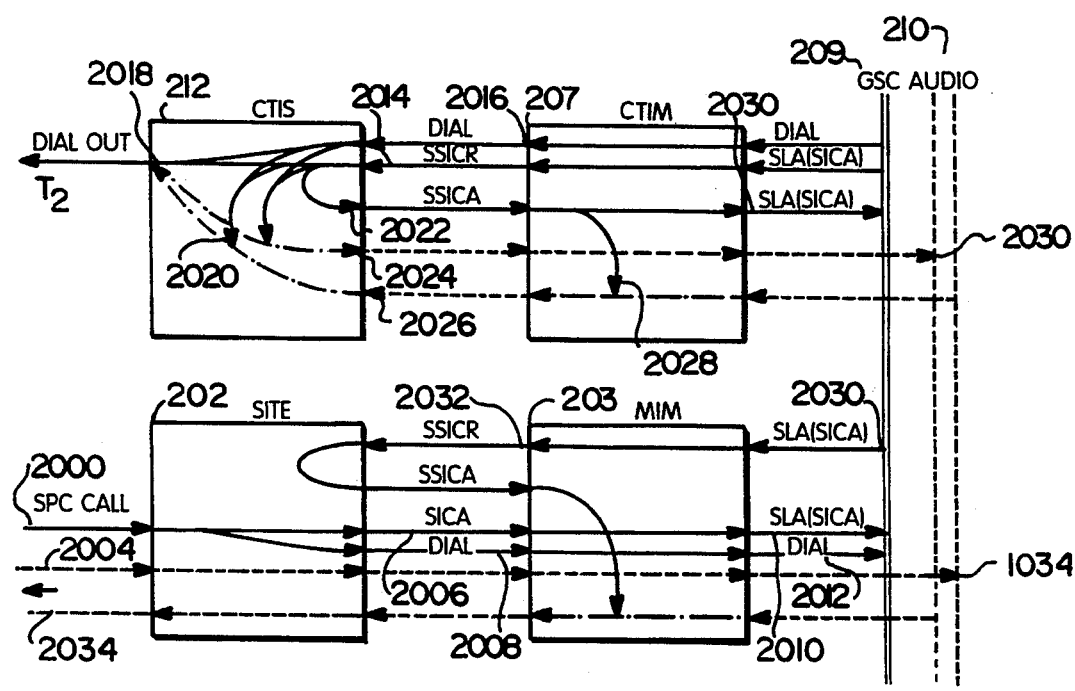

FIG. 10 shows the messaging sequence for origination of an outbound individual interconnect call. When a radio user dials a telephone number through the radio unit step (SPC CALL) 2000, the radio sends the telephone number over the site control channel to the site 202. In response, the site assigns a working channel 2004 to the call and forwards to the MIM a channel assignment (SICA) message 2006 and the dialed telephone number 2008. The MIM generates a slot assignment (SLA (SICA)) message 2010 identifying the bus/slot on which the outgoing telephone call from the radio user will be routed on the audio bus, and identifying the radio caller and CTIM. In addition, the MIM generates a digital message (DIAL) 2012 addressed to the CTIM conveying the digital telephone number to be called.

The CTIM picks up both the slot assignment message and digital telephone message from the message bus 209. In response, the CTIM 207 generates a secondary channel request (SSICR) 2014 that it forwards to the CTIS. The CTIM also forwards the number (DIAL) 2016 to the CTIS so that the CTIS can dial out 2018 to call the telephone callee. The CTIS also establishes audio paths 2020 to the telephone line $T_2$ for audio from the multisite switch out to the line $T_2$ and from the line to the multisite switch. Moreover, the CTIS generates a secondary channel assignment (SSICA) message 2022 to the CTIM.

In response to the secondary channel assignment message 2022, the CTIM links 2028 the outbound audio pathway 2026 to the bus/slot 1034 on the audio bus 210 allocated by MIM 203 to the audio path 2004 from the site. In addition, the CTIM broadcasts a slot assignment (SLA (SICA)) message 2030 informing all MIMs, but acted upon only by the MIM having the calling radio user logged into its site, of the secondary channel 2024 and the bus/slot 2030 assigned to that channel on the audio bus 210.

Upon receipt of the slot assignment message, the MIM forwards to the site 202 a secondary channel request (SSICR) 2032 that causes the site to reassign the previously assigned working channel 2004 for audio from the telephone to the site. In an RF communication, the site would assign a separate working channel for inbound and outbound communications (transmission trunking rather than message trunking). However, for individual interconnect telephone calls the site makes one assignment for an RF working channel which is used for both inbound and outbound audio signals (message trunking).

Figure 11:
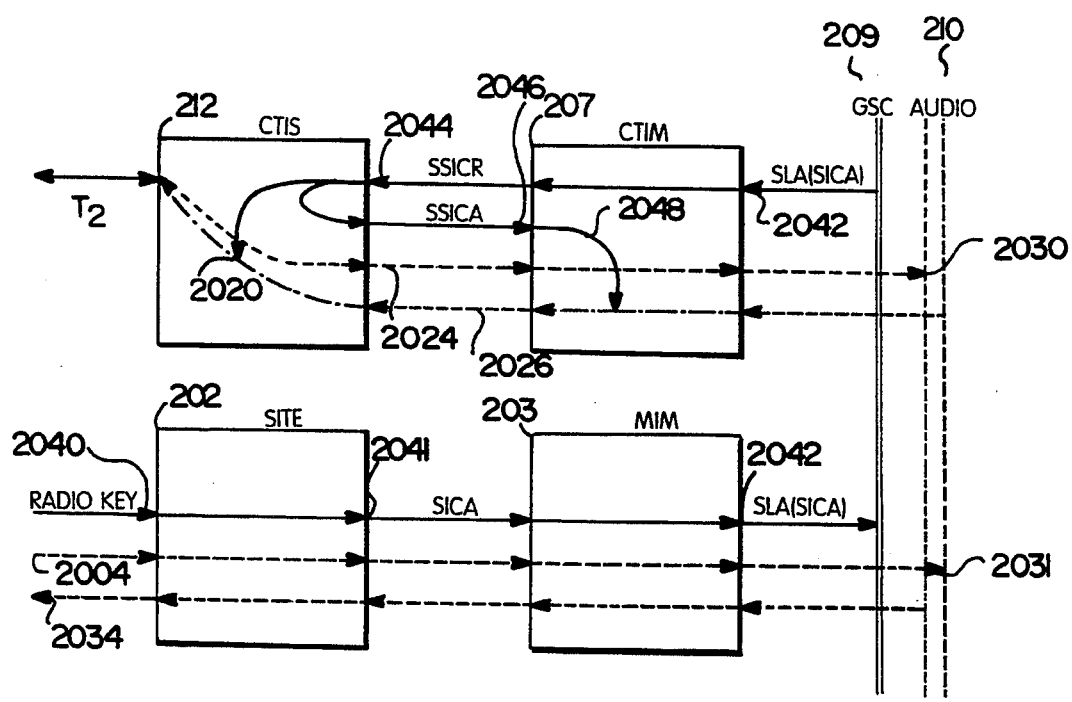

FIG. 11 shows the message and audio routing sequences that enable a radio user caller to begin talking, transmitting audio signals, over a telephone line. The audio pathways $T_2$, 2024, 2026, 2030, 2031 (the bus/slot on audio bus 210 allocated by the MIM for audio from site), and site RF links 2004 and 2034 were established during the origination sequence. When the radio operator decides to talk, the radio is keyed or rekeyed 2040. Upon receiving the RF keying message, the site 202 sends a channel assignment (SICA) message 2041 to the MIM that informs the MIM of the working channel 2004 (2034) previously assigned to the call by the site during the origination sequence. The MIM sends a slot assignment (SLA (SICA)) message 2042 over the message bus 209 that is retrieved by the CTIM and forwarded as a secondary channel request (SSICR) 2044 to the CTIS.

The CTIS sends a secondary channel assignment (SSICA) message 2046 to the CTIM to cause the CTIM to connect 2048 the audio path 2026 established by the CTIS to the bus/slot 2031 allocated by the MIM for audio from the radio caller.

Figure 12:
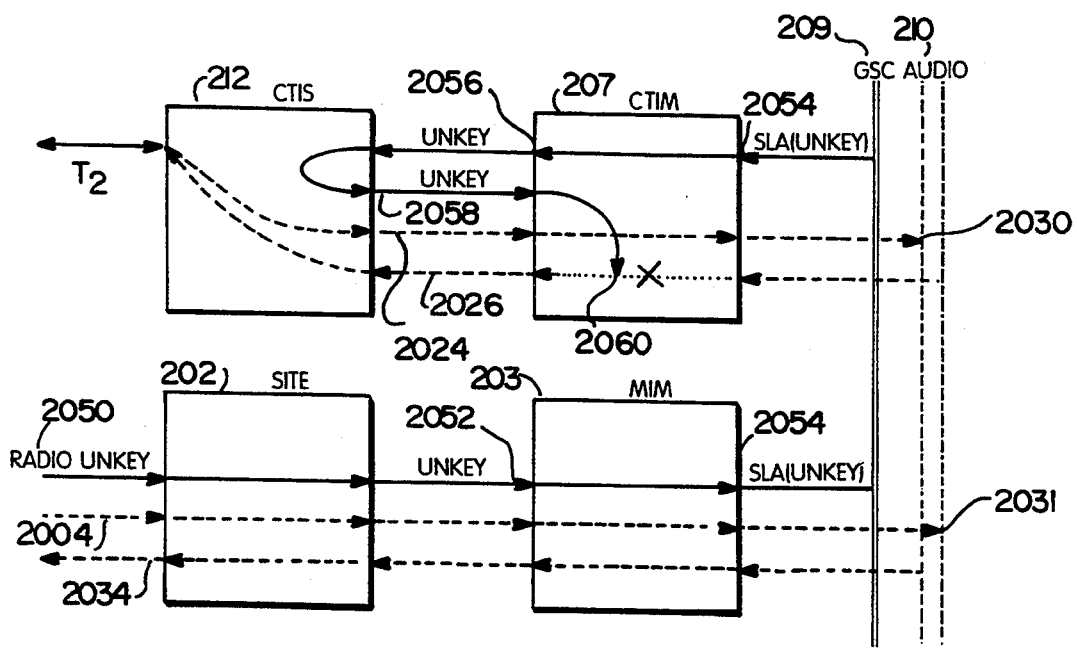

FIG. 12 shows the sequence for the originating caller radio unkey sequence. When the caller radio user unkeys 2050 to signify he has stopped talking (possibly only temporarily), a radio unkey message is sent to the site which in turn forwards an unkey message 2052 to the MIM. The MIM sends a slot assignment (SLA (UNKEY)) message 2054 over message bus 209 notifying the CTIM of the unkey. The CTIM forwards an unkey message 2056 to the CTIS. As previously explained, the CTIS has the option of sending an unkey message 2058 back to the CTIM to cause the CTIM to disconnect 2060 audio path 2026 from the bus/slot 2031 allocated to the site. Generally, the CTIS will generate an unkey message 2058 after a hang time period, e.g., 30 seconds, elapses without a rekey signal.

Figure 13:
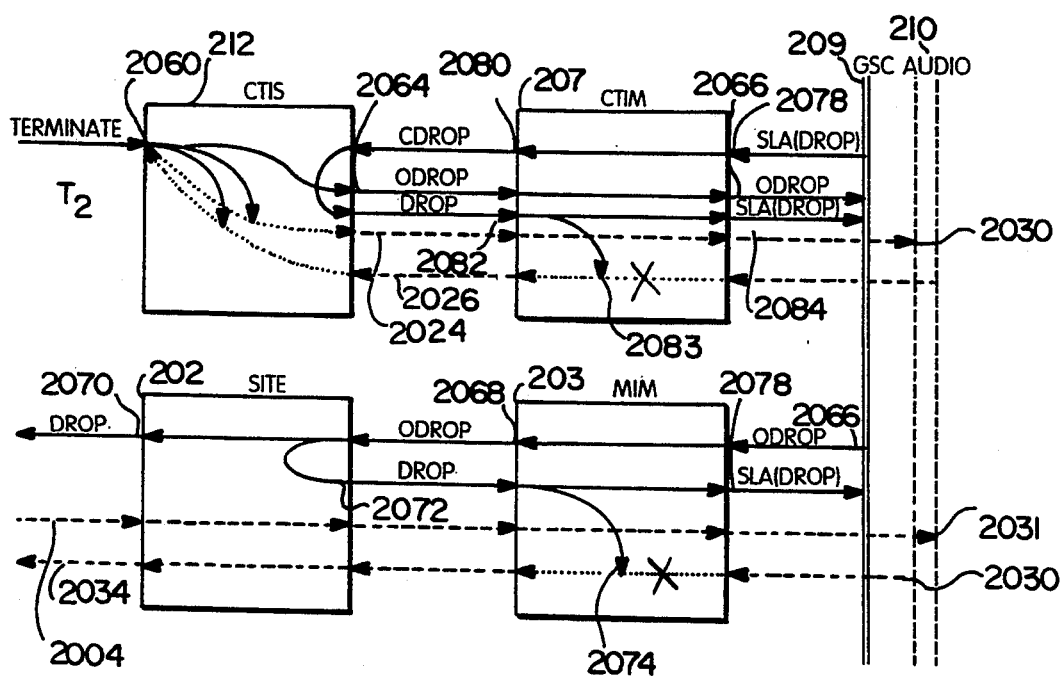

FIG. 13 shows the message and audio routing sequence for termination of a outbound (radio user initiated) individual interconnected call by a telephone callee. When the called party terminates the call, the CTIS receives a telephone disconnect signal 2060 that causes the CTIS to disconnect its two audio links 2024, 2026 to the telephone line $T_2$. In addition, the CTIS sends an originator drop (ODROP) message 2064 to the CTIM which the CTIM reformats into an ODROP 2066 message broadcast on the message bus 209. The MIM 203 acts on the ODROF message by generating its own original drop (ODROP) message 2068 that it forwards to the site 202. In response, the site broadcasts on its control channel a drop signal 2070 and returns a drop message 2072 to the MIM.

The MIM disconnects 2074 its audio connection to the bus/slot 2030 allocated by the CTIM for audio received from the telephone line. In addition, the MIM drops the slot assignment 2030 identification from its data base list and broadcasts a slot assignment (SLA (DROP)) message 2078 on the message bus. This slot assignment message notifies the nodes of the multisite switch that the site 202 has dropped the call, and, in particular, causes the CTIM to send a callee base drop (CDROP) message 2080 signal to the CTIS. In response, the CTIS returns a drop message 2082 to the CTIM so that the CTIM can disconnect 2083 its audio link 2026 to the bus/slot 2031 allocated by the MIM to audio from the radio callee. In addition, the CTIM sends a slot assignment (DROP) message 2084 on the message bus and deletes the slot assignments from its data base. This last slot assignment message is redundant for those MIMs that have acted on prior slot assignment messages, but will cause any nodes in the multisite switch which did not receive or act on the original slot assignment messages to drop the call.

Figure 14:
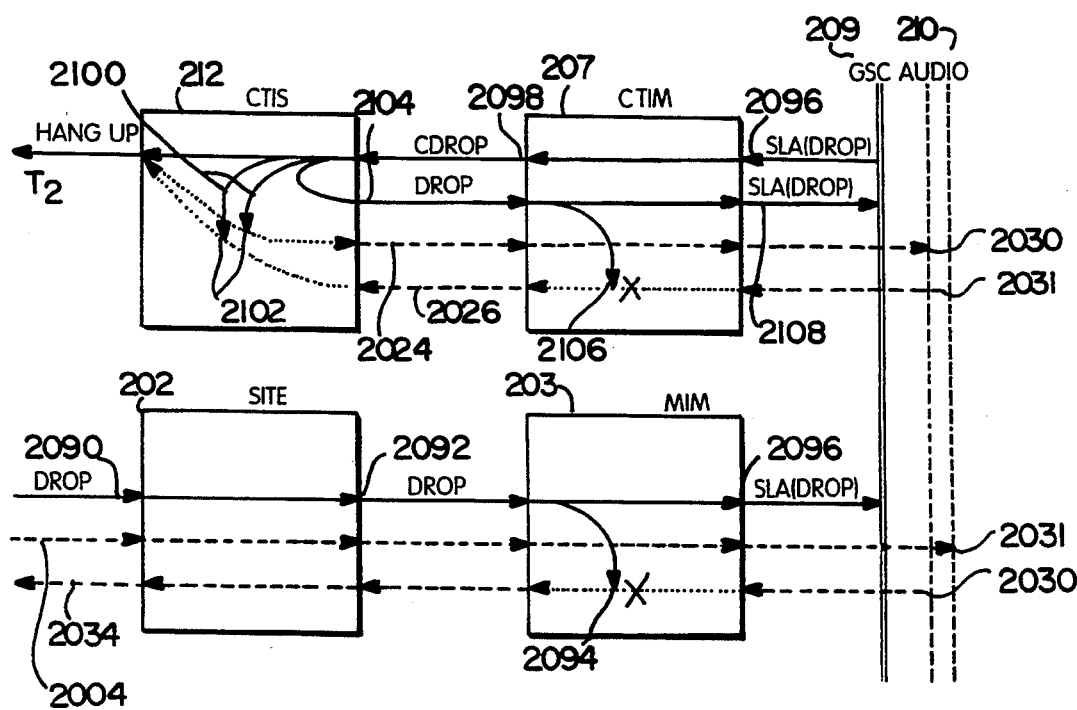

FIG. 14 shows the message and audio routing sequence that occurs when a radio caller drops out of an outbound individual interconnect call. When the radio user that made the telephone call drops, in contrast to simply unkeying, a call 2090, the site 202 sends a drop message 2092 to the MIM 203. The drop may also occur automatically after the call exceeds a selected period of time, e.g., 5 mins., but in such a case the participants are warned by a short series of audible tones. In response to the drop signal, the MIM disconnects 2094 its audio path with the site channel 2004 (2034) from its link to the bus/slot 2030 allocated by the CTIM for audio from the telephone callee. In addition, the MIM sends a slot assignment (SLA (DROP)) message 2096 addressed to the CTIM notifying it of the call drop.

In response, the CTIM sends a callee base drop (CDROP) message to the call drop 2098 to the CTIS 212. The CTIS disconnects its links from the telephone line T₂ to the audio pathways 2024, 2026 to the CTIM 2102. In addition, the CTIS sends a drop signal 2104 to the CTIM to cause the CTIM to disconnect 2106 the CTIS audio path 2026 from the bus/slot 2031 that the MIM had allocated to the audio from the radio user to the telephone line. The CTIM also broadcasts a slot assignment (SLA (DROP)) message 2108 and deletes the slot assignment from the CTIM's data bases. The slot assignment message is redundant and will only be acted upon by a MIM that did not respond to the earlier message.

C. Telephone Initiated Inbound Group Interconnect Calls

The telephone caller may call a group of mobile radio users instead of an individual radio unit. The sequences of messages and audio routing for an inbound group call are similar to the sequences for an individual call. Accordingly, the description of the messaging and audio routing for inbound individually interconnect calls (FIGS. 5 through 9) are incorporated by reference and this description of group calls is limited to the differences that group calls have to individual calls.

Figure 15:
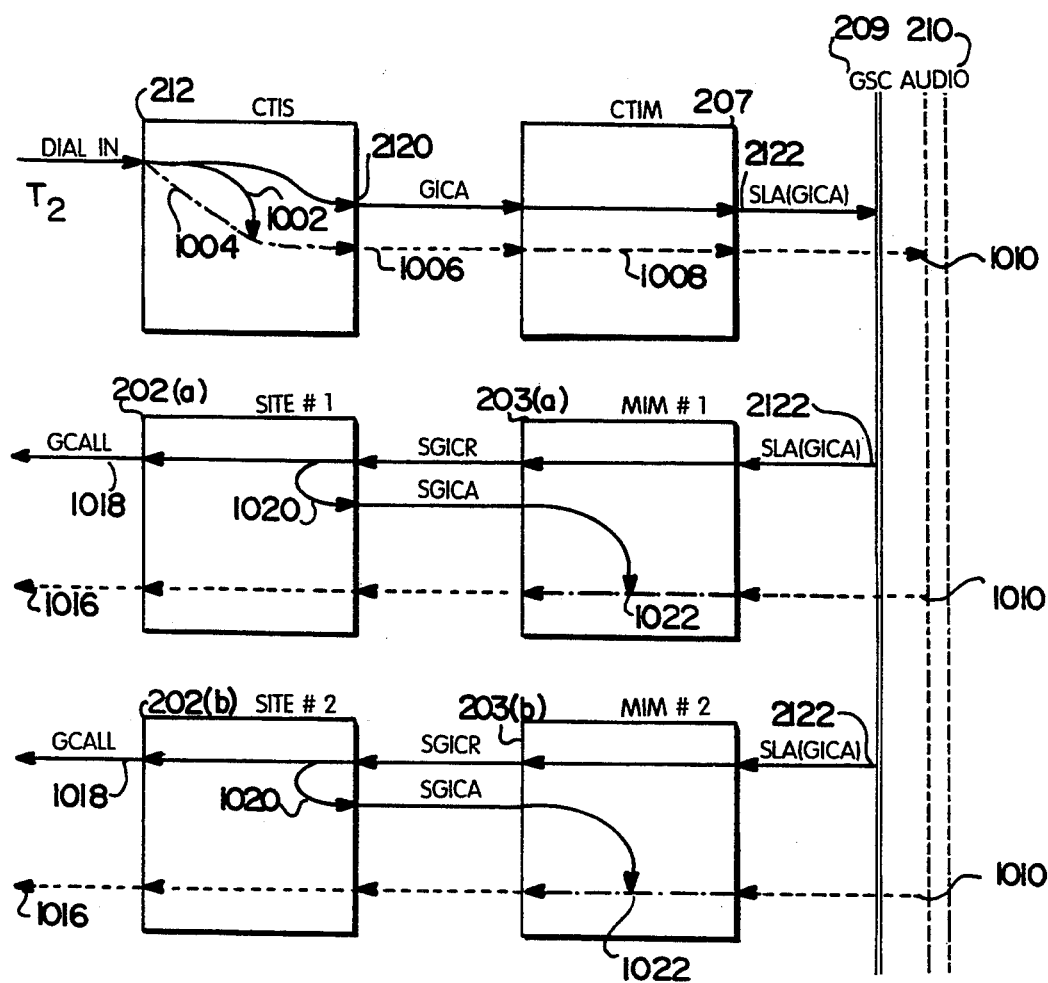

FIG. 15 shows the origination sequence for an inbound group interconnect call dialed in from a telephone line. To the extent there are similarities with inbound individual interconnect calls, FIG. 15 and its numeral designations correspond to that of FIG. 5 that shows the origination sequence for an inbound individual interconnect call. For the common information in FIG. 15 and FIG. 5, the description for that common information is given with respect to FIG. 15 and is not repeated for FIG. 15.

When dialing, the telephone caller will either use a dedicated phone line for a particular multisite users group or will enter a group I.D. by digital message or DTMF tones to designate the intended callee group. In response, the CTIS sends a group interconnect channel assignment (GICA) message 2120 that notifies the CTIM of the audio path 1006, i.e., RIC connection, from the CTIS to the CTIM carrying the audio from the telephone caller. The GICA message designates the group that is being called, the originating telephone line (RIC 1006) and the CTIS.

Upon receiving the GICA message 2120, the CTIS broadcasts a slot assignment (SLA (GICA)) message 2122 for the group interconnect call. The slot assignment message designates the intended callee group, the caller, i.e., CTIS, and the bus/slot 1010 that the CTIM has used to route the audio 1008 from this telephone call.

The SLA (GICA) message is received by all MIMs. Each MIM checks its data bases to determine whether any of the mobile radio members of the callee group are within its site. If so, the MIMs, 203(a) and 203(b) act on the message 2122 in a manner similar to the way they would act if an individual interconnect call slot assignment message would have been received as is shown in FIG. 5.

Figure 16:
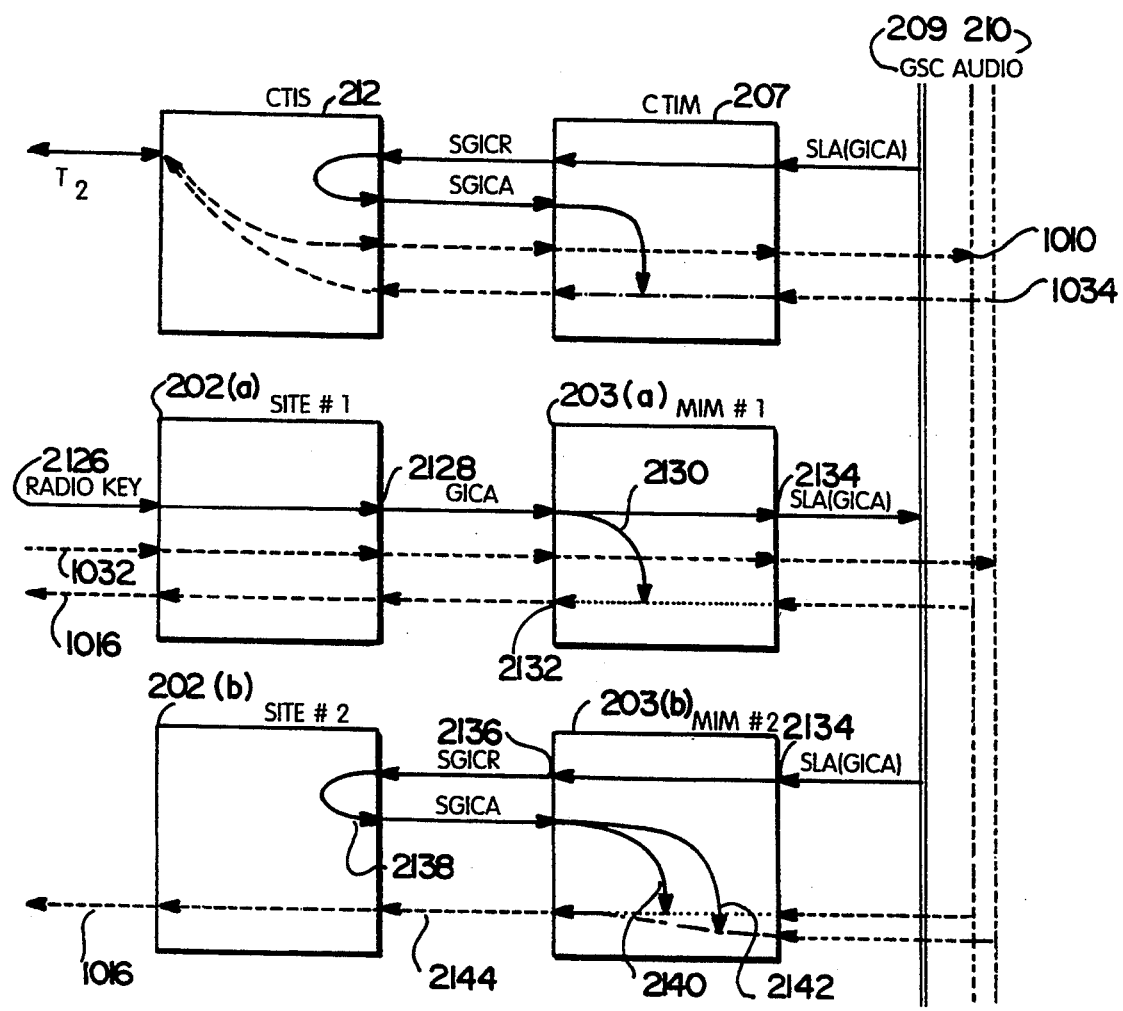

FIG. 16 shows the message and audio routing sequences that occur when a mobile radio callee in a telephone caller initiated group call keys the callee's radio to talk to the telephone caller and other members of the group. FIG. 16 corresponds to a large extent to the radio key sequence shown for an individual telephone call shown and described with respect to FIG. 6. The major difference in the radio key sequence with group calls and the sequence for callee keying during an individual call is that when a mobile radio unit keys to transmit an audio path must be established to the other MIMs and sites involved in the call in addition to an audio path back to the telephone line callee.

Upon receipt of a radio key signal, site 1202(a) issues a group interconnect channel assignment (GICA) message 2128 to MIM 1203(a) that causes the MIM to disconnect 2130 its audio link 2132 to the bus/slot 1010 on which the CTIM has routed audio from the telephone line. This operation is in contrast to the individual call radio key sequence where the MIM does not disconnect the audio path from the telephone to the site when the individual radio callee keys the radio.

In group calls it is necessary for the MIM to disconnect its audio path to the CTIS so that the site 202(a) can switch from a multisite operation to a local repeat operation for the keyed mobile radio transmission. A local repeat operation is needed because the site needs to rebroadcast audio transmission from the keying radio user to other members of the group within the same site 202(a). Other group members in the site will hear the audio from the keyed radio 2126 rather than audio from the telephone T$_2$.

It is assumed that the telephone caller T$_2$ will stop talking upon hearing a user of a keyed radio begin talking. Given this assumption, the group members in the site would rather hear the keyed radio audio which is transmitting audio signals, rather than hear dead audio from the telephone. Even though the MIM 203(a) disconnects its link to the bus/slot 1010, it does not delete the CTIM call from its slot data base because it will likely reconnect to the slot/bus for that call after the radio unkeys.

In addition to disconnecting from bus/slot 1010, MIM 203(a) also broadcasts a slot assignment (SLA (GICA)) message 2134 to the other MIMs and to the CTIM. The CTIM operates on the slot assignment message in the same manner that is described in FIG. 6. The MIMs having other group members in its site, e.g., MIM #2 2203(b), act on the slot assignment 2134 by forwarding a secondary channel request (SGICR) message 2136 to their respective sites #2-202(b) that have members of the callee group. Site #2 in turn sends a secondary group interconnect channel assignment (SGICA) 2138 to its MIM #2. In response, the MIM disconnects 2140 its link to the bus/slot 1010 to the telephone line call. The MIM #2 connects 2142 its previously existing audio path 2144 to the bus/slot 1034 identified in the slot assignment message broadcast by MIM #1 so that all group members in its site 2 can hear voice from the keyed radio unit in site #1. As with group members in site 1, group members in site 2 and other participating sites cannot hear the telephone caller while a mobile radio group member in any site is keyed to transmit.

Figure 17:
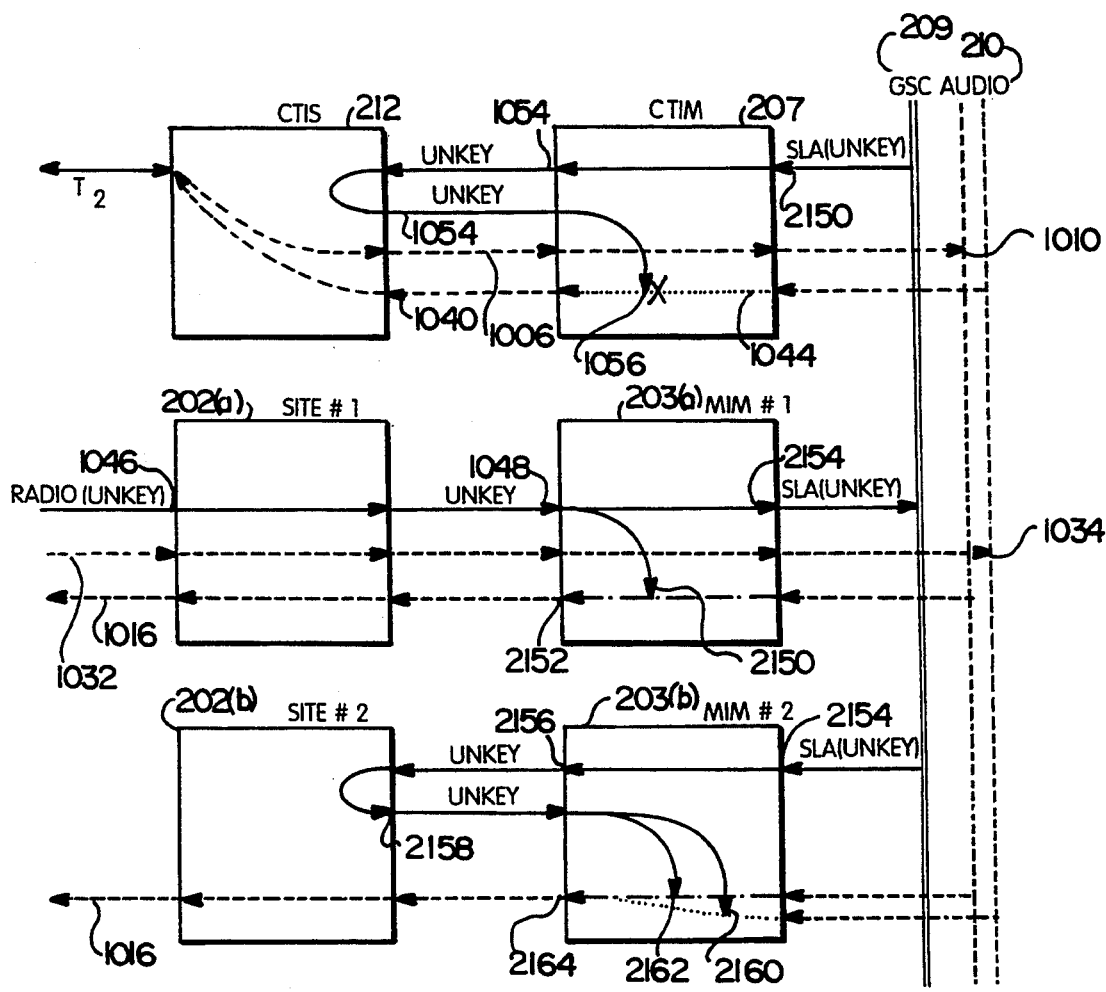

FIG. 17 shows the sequences for messages and audio routing when a mobile radio callee unkeys a transmission in a group call initiated by a telephone callee. To a large extent this unkey sequence corresponds to the radio unkey sequence for a telephone interconnect individual callee call that is shown in and described with respect to FIGURE 7. The group unkey sequence differs principally in that the MIMs reconnect to the audio path from the CTIS in response to an unkey signal.

When a keyed radio unkeys 1046, its site 202(a) sends an unkey message 1048 to MIM 203(a). In response, the MIM reconnects the sites audio path 2152 for the call to the bus/slot 1010 having the audio transmission from the telephone line from CTIS. In addition, MIM #1 sends a slot assignment (SLA (UNKEY)) message 2154 which is acted on both by the CTIMs and MIMs having units participating in the group call. The CTIM acts on the slot assignment message in the same way as described in FIG. 7. MIM 2203(b) acts on the slot assignment message by forwarding an unkey message 2156 to site #2 which turn sends an unkey message 2158 to MIM #2.

The unkey message from the site causes MIM #2 to disconnect 2160 its connection to the bus/slot 1034 for the audio from the radio channel 1032 from site #1. MIM #2 connects 2162 to the bus/slot 1010 having the audio from the telephone line. MIM #2 retains the designation for audio bus/slot 1010 because it maintained that information in its data bases when disconnecting from the CTIM audio bus/slot in processing the radio key message. Accordingly, it is unnecessary to broadcast the CTIM bus/slot identifier on the message bus 209 in conjunction with processing a radio unkey message.

Figure 18:
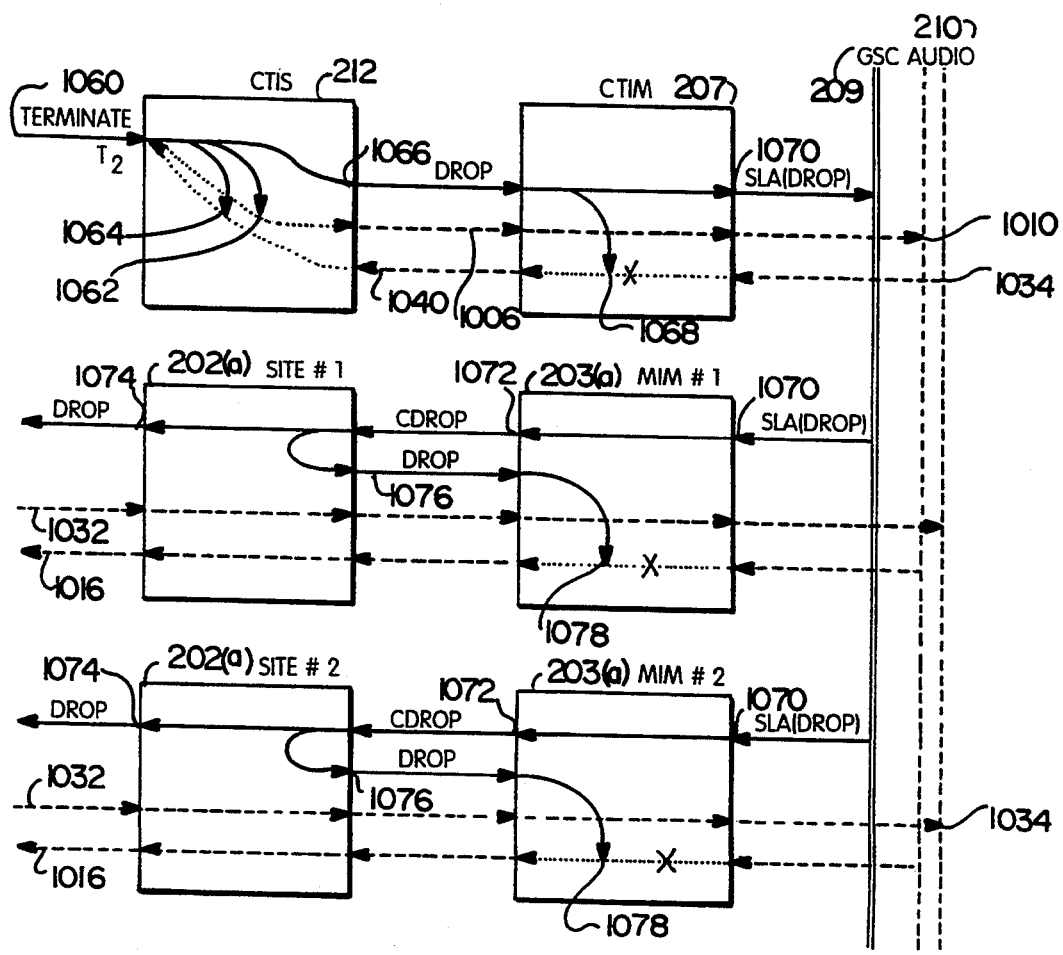

FIG. 18 shows the call DROP sequence when the telephone callee disconnects a group call. This sequence is substantively identical in all respects to the telephone callee DROP sequence in an individual call shown and described in conjunction with respect to FIG. 8. Accordingly, an explanation of FIG. 18 can be had by referring to the explanation for FIG. 8.

Figure 19:
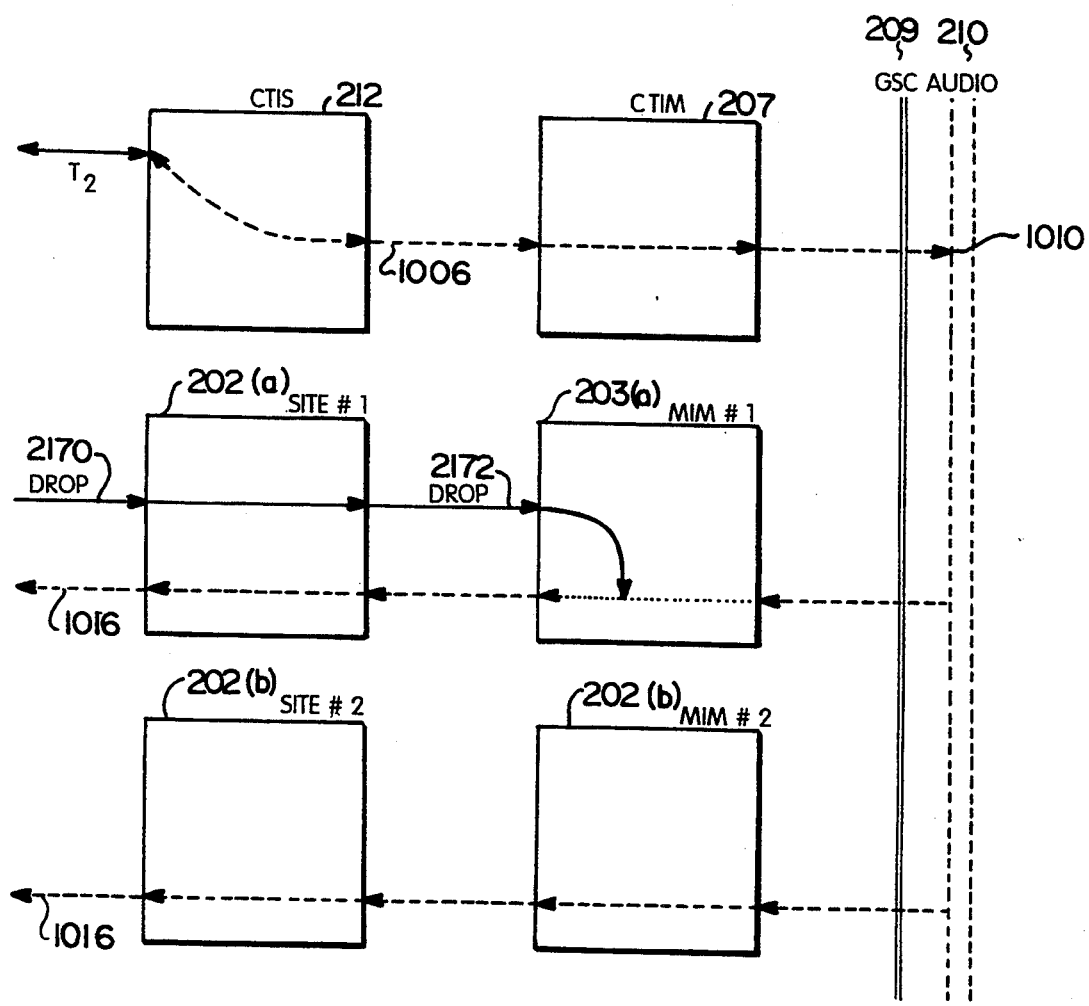

FIG. 19 shows the sequences for messaging and audio routing that occur when an individual radio unit in a group call drops from a telephone callee initiated group call. A group member radio unit can issue a drop regardless of whether it is keyed to transmit. FIG. 19 shows the simple DROP sequence when the radio is not keyed when it drops and, thus, there is no audio path from the radio user to the other group members and the telephone callee. However, if an audio path is set up from the radio user when the radio user issues a DROP command, i.e., the radio unkeys and drops at about the same time, then the DROP sequence as described in conjunction with the unkeying sequence shown in FIG. 17 is executed, with the exception that the CTIS 212 will unconditionally disconnect 1056 its audio link to the bus/slot 1034 for audio receptions from the radio unit in addition to executing the DROP sequence shown in FIG. 19.

In the DROP sequence shown in FIG. 19, once site #1 202(a) receives the DROP message 2170, it sends a DROP message 2172 to its MIM 203(a). In response the MIM disconnects from the bus/slot 1010 corresponding to the audio from the CTIM. This disconnection and the DROP signal 2170 causes site #1 to cancel its working channel 1016 assigned to the group call and allow the group members within the site to switch back to the control channel. In addition, MIM #1 deletes the slot assignment for the audio on bus/slot 1010 from its data base. If any member of a group call drops the call, all users return to the control channel of their respective sites and the multisite switch clears the call from its databases.

Figure 20:
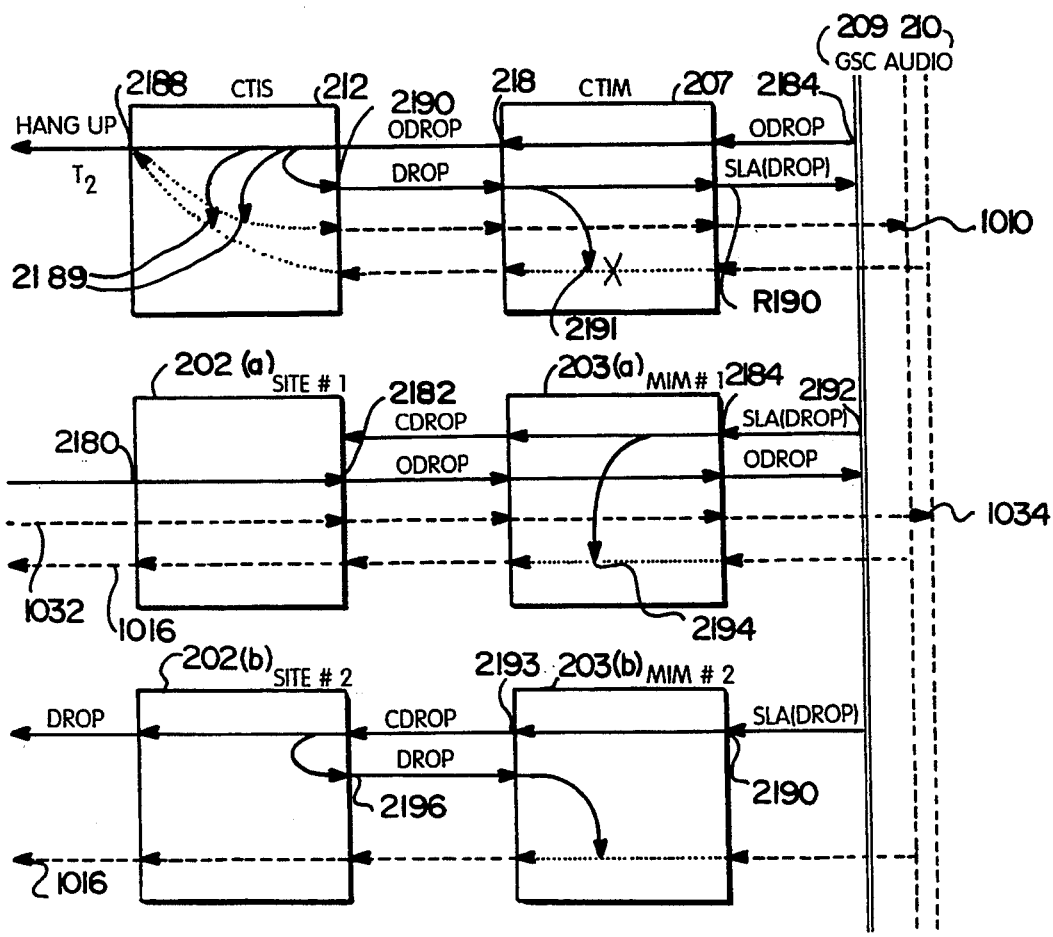

FIG. 20 shows the sequence for the message and audio routing for the termination of a transmitting radio user in a group call initiated by a telephone callee. When a keyed radio user having channel 1032 issues a radio DROP signal 2180 over its working channel 1032 to site #1 202(a), the site sends an originator drop (ODROP) 2182 message to MIM #1 203(a). In response, the MIM broadcasts an originator DROP message 2184 addressed to the CTIM over the message bus 209.

The CTIM acts on the ODROP message by forwarding an originator drop (ODROP) message 2186 to the CTIS which causes the telephone line to hang up 2188. The multisite switch has one entry in its database for this one, wide-area group call. A single drop message coming from any one radio in the group or from the phone user, is all that is required to drop the call completely.

The CTIS also disconnects 2189 both of its incoming and outbound audio links between the telephone line T$_2$ and its audio paths to the CTIM. The CTIS forwards a DROP message 2190 to the CTIM advising the CTIM to drop the telephone call originated from the CTIS. In response, the CTIM disconnects 2191 its connection to bus/slot 1034 carrying the audio received from site #1 and the previously keyed mobile radio unit. In addition, the CTIM sends a slot assignment message 2192 that is retrieved by the MIMs participating in the group call.

The MIMs participating in the group call act on the slot assignment message 2192 by forwarding a callee based drop (CDROP) message 2193 to their respective sites. However, the MIM #1 which had the originating radio drop and which already had information in its data base indicating that the call is being dropped, automatically disconnects 2194 its audio connection to the bus/slot 1010 carrying the audio from the CTIS telephone link. The other sites do not disconnect their link to bus/slot 1010 until receiving a DROP message 2196 from their respective sites, e.g., site #2. At that time the MIMs disconnect their link to the audio bus and remove the slot assignment from their data bases. Their respective sites cancel the working channel 1016 and allow the mobile group users to switch back to their respective site control channels.

D. Dispatcher Console Initiated Outbound Interconnect Calls

When a dispatcher places an outbound telephone call from a console, the types of sequences of messages and audio routing for the call are: origination, console key, console unkey, land line (telephone) originator drop, console drop and patch.

Figure 21:
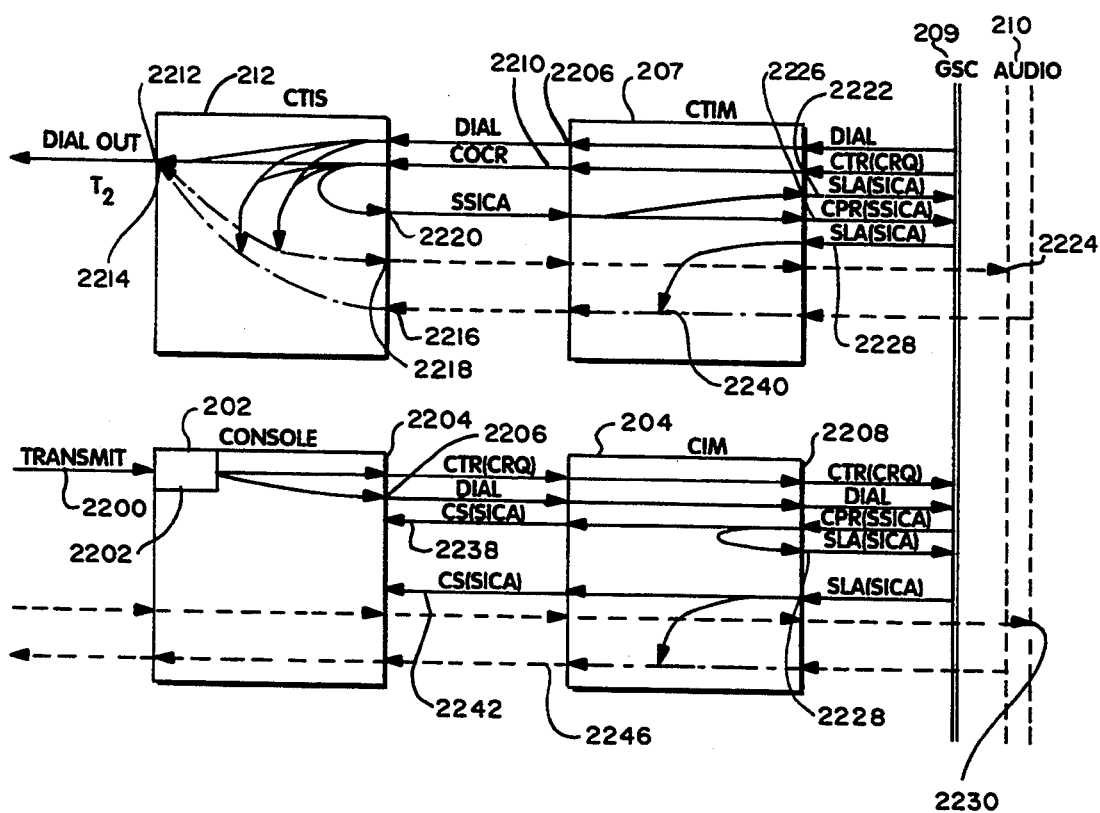

FIG. 21 shows the sequence for messages and audio routing for an outbound dispatch interconnected call origination sequence. A dispatcher transmits 2200 on a previously idle phone module 2202 in console 202 and the console itself send a console channel request CTR (CRQ) 2204 and the digital dial message 2206 to the CIM 204. The CTR (CRQ) from the console causes the CIM to generate a console transmit request CTR (CRQ) message 2208 onto the message bus 209 addressed to the CTIM 207. The digital dial message 2206 is also forwarded by the CIM over the message bus to the CTIM.

The CTIM forwards the dial message 2206 and a console originated channel request (COCR) message 2210 to the CTIS 212. Upon receipt of these messages, the CTIS establishes a telephone connection and dials 2212 the telephone number on an available telephone line. In addition, the CTIS links the assigned telephone line interconnecting crossbar (LIX) 2214 to inbound 2216 and outbound 2218 repeater interconnect controllers (RIC) to establish audio paths from the phone line to the CTIM. In addition, the CTIS sends a secondary channel assignment (SSICA) message 2220 to the CTIM that causes the CTIM to broadcast a secondary channel assignment SLA (SICA) message 2222 that identifies the slot/bus 2224 carrying the audio incoming to the multisite system from the telephone line and the console. In addition, the CTIM generates a channel primitive CPR (SSICA) message 2226 addressed to the CIM to identify the audio route, i.e, RIC, in the CTIS that has been allocated for audio from the console through to the CTIM and outbound on the telephone line 2216. At that time, the CTIM does not know which bus/slot on which is the audio from the CIM and thus cannot connect to the appropriate audio bus 210. However, upon receipt of the channel primitive message 2226, the CIM 204 rebroadcasts a slot assignment (SLA (SICA)) message 2228 to notify the CTIM of the bus/slot 2230 carrying audio from the console. In addition, the CIM sends a call status (CS (SICA)) message 2232 to the console to notify the console that the audio routing for the console is set up.

When the CTIM receives the slot assignment message 2228 from the CIM, it establishes 2240 a connection between the bus/slot 2230 carrying audio from the console to the audio path 2216 in the CTIS for receiving audio from the console and routing it to the telephone line. The slot assignment message 2222 from the CTIM is in one embodiment generated in response to the secondary channel assignment message 2220 from the CTIS. However, in another embodiment the slot assignment message could be generated in response to a primary assignment generated by the CTIS later in the sequence. Nevertheless, in the disclosed embodiment the slot assignment message is in response to the secondary channel assignment 2220. The slot assignment message is retrieved by the CIM which sends a call status (CS (SICA)) message 2242 to the console which, similar to console status message 2238, notifies *the console that another audio pathway has been set up. In addition, the CIM connects its outbound audio line 2246 to the bus/slot 2224 carrying the audio from the telephone call from the CTIM. In this way, bidirectional audio pathways are established between a telephone line and a dispatcher console.

Figure 22:
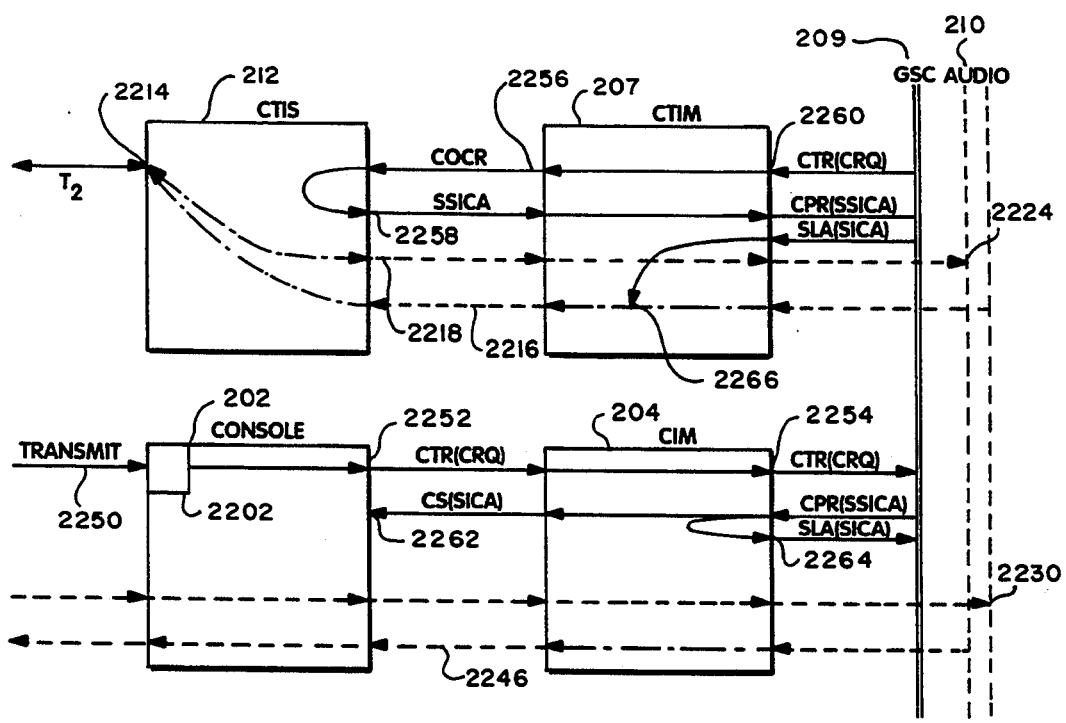

FIG. 22 shows the console key sequence that allows the console to talk, i.e., transmit audio, over the telephone line once an audio pathway has been set up in the origination sequence. When the console operator keys or rekeys the microphone 2250, the console sends a channel request CTR (CRQ) message 2252 to the CIM. In response, the CIM broadcasts a console transmit request (CTR (CRQ)) message 2254 to the CTIM. The CTIM sends a secondary channel assignment (CORC) message 2256 to the CTIS. In response, the CTIS sends a secondary channel (SSICA) assignment message 2258 that causes the CTIM to broadcast a channel primitive message 2260 to notify the CIM that the CTIM has established an audio path from the CTIS for audio from the CIM to be routed through the CTIM.

In response to the channel primitive message 2260, the CIM broadcasts a console status message 2262 to the console and a slot assignment (SLA (SICA)) message 2264 notifying the CTIM which audio bus/slot 2230 is carrying audio from the console, The CTIM connects 2266 this bus/slot 2230 to its audio link 2216 for outgoing audio from the CTIS and telephone callee. Accordingly, the console now has a duplex audio path, has been keyed to transmit and the dispatcher can begin talking through the multisite switch system over the telephone line to the telephone callee.

Figure 23:
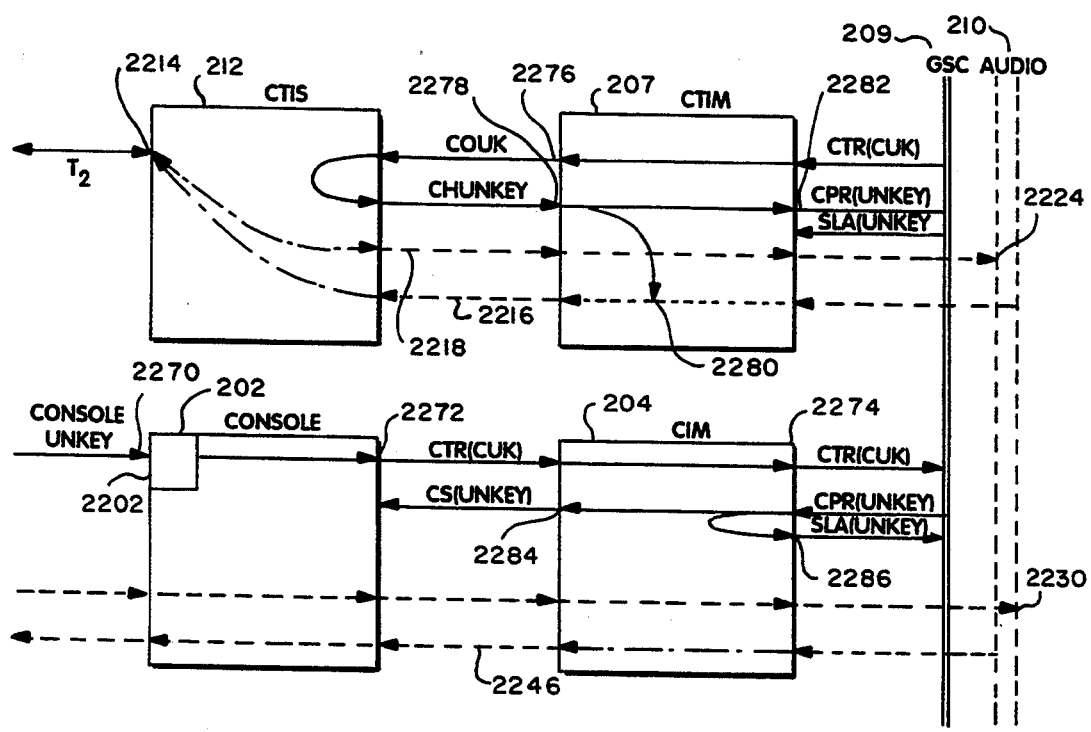

FIG. 23 shows the sequence for messaging and audio routing that occurs when the console unkeys during an outbound dispatch interconnect call. When the console operator unkeys 2270, the console sends a console unkey message CTR (CUK) 2272 to the CIM which broadcasts a console transmit (CTR (WK)) request 2274 on the message bus 209 to notify the CTIM of the unkey. In response, the CTIM sends a console unkey message (COUK) 2276 to the CTIS which returns an unkey message (CHUNKEY) 2278 back to the CTIM. The CTIM disconnects 2280 its audio link to the bus/slot 2230 for the audio from the console. In addition, the CTIM broadcasts a channel primitive (CPR (UNKEY)) 2282 message informing the CIM of the confirmatory channel unkey from the CTIS. Upon receiving this channel primitive, the CIM sends a call status (CS (UNKEY)) message 2284 to the console and broadcasts a slot assignment (SLA (UNKEY)) message 2286 reconfirming the unkey to the CTIM.

Figure 24:
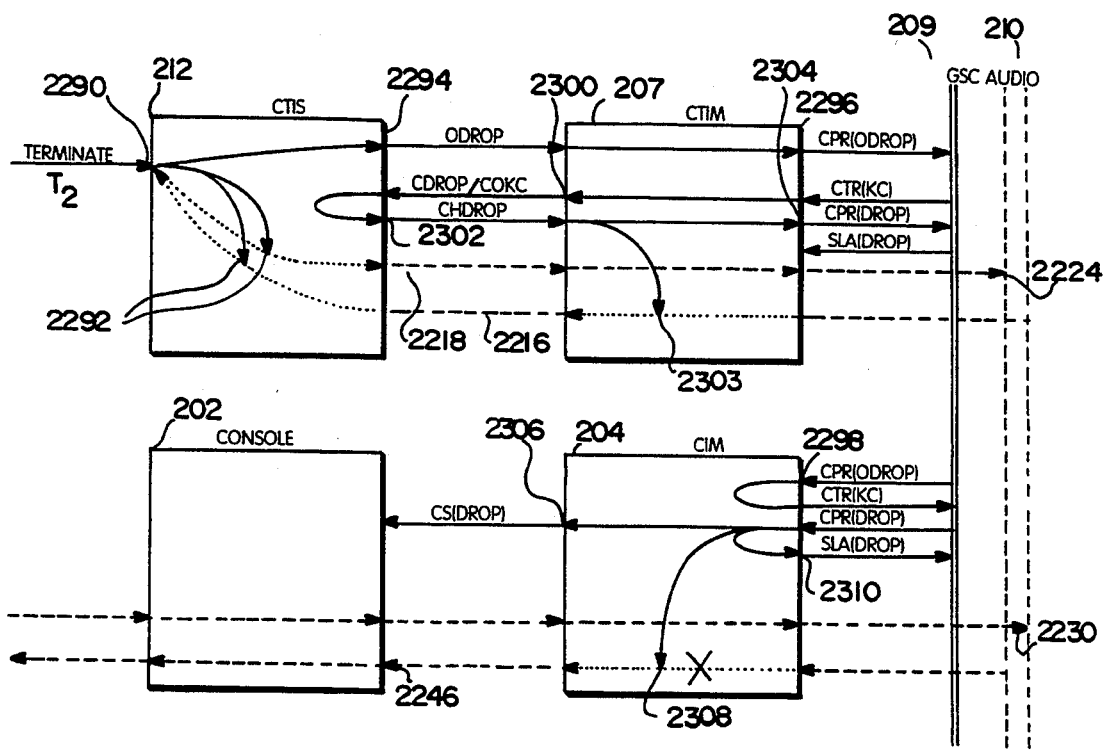

FIG. 24 shows the sequence for messages and audio routing when the telephone callee drops, i.e., hangs up, the telephone call for an outbound dispatcher originated interconnect call. When the telephone callee terminates the call 2290, the CTIS disconnects its links between the telephone line T₂ and the inbound and outbound audio RIC links 2218, 2216 to the CTIM as shown in step 2292.

In addition, the CTIS sends an originator drop (ODROP) message 2294 to the CTIM which in turn sends a channel primitive (CPR ODROP)) message 2296 to notify all nodes in the multisite switch of the originator drop by the CTIS. The CIM 204, which is the only node acting on the channel primitive message, broadcasts its own console transmit request/kill call (CTR (KC)) message 2298 to notify the nodes in the multisite switch that the console initiated telephone call is being terminated.

The CTIM picks up the kill call message 2298 and sends the CTIS a callee based drop (CDROP/COKC) message 2300 to notify the CTIS that the console is terminating the telephone call. In response, the CTIS sends a drop (CHDROP) message 2302 back to the CTIM and drops the call, if it has not already done so. The CTIM disconnects 2303 its outbound audio link 2216 to the CTIS from the bus/slot 2230 on which the CIM had routed the audio from the console. In addition, the CTIM sends a channel primitive (PR (DROP)) message 2304 addressed to the CIM and providing a notice that the CTIS has dropped the console initiated telephone call.

The channel primitive 2304 is retrieved by the CIM which then forwards a call status (CS (DROP)) message 2306 to the console, disconnects 2308 its outbound audio link 2246 to the console from the bus/slot 2224 on which the CTIM had placed the audio from the telephone line, and broadcasts on the message bus a slot assignment (SLA (DROP)) message 2310 that is picked up by the CTIM. The CTIMs use the slot assignment message to update its data bases, if they have not already done so.

Figure 25:
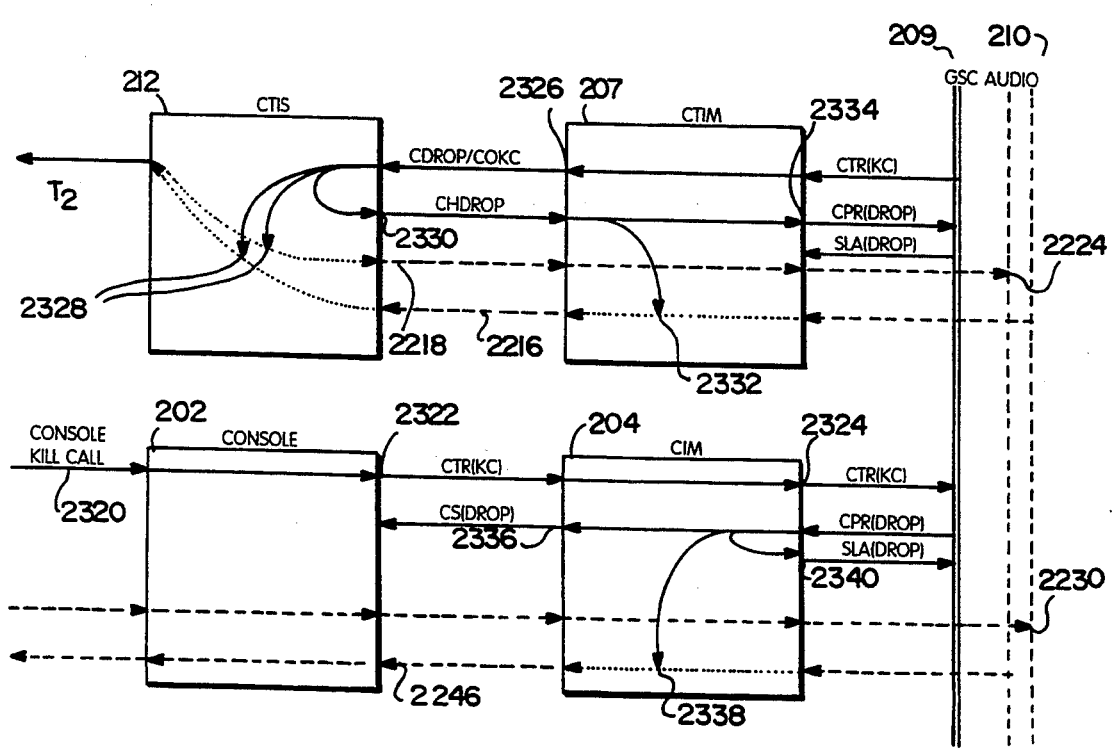

FIG. 25 shows the sequences for messaging and audio routing that occur when the initiating dispatcher caller drops the telephone call for an outbound dispatch interconnected call. When the dispatcher terminates a call 2320, the console sends a console transmit request/kill call (CTR (KC)) message 2322 to the CIM which in turn broadcasts a console transmit request/kill call (CTR (KC)) message 2324 on message bus 209. This message is addressed to the CTIM which retrieves the message and forwards a callee based drop (CDROP/COKC) message 2326 to the CTIS.

The CTIS disconnects 2328 its audio RIC links 2218, 2216 from its link to the telephone line T₂. In addition, the CTIS sends a channel drop (CHDROP) message 2330 to the CTIM which disconnects 2332 its outbound audio link 2216 from the bus/slot 2230 on the audio bus 210 having audio from the console and CIM. In addition, the CTIM sends a channel primitive (CPR (DROP)) message 2334 to the CIM to notify it that the CTIS has dropped the telephone call.

The CIM retrieves the channel primitive message and sends a call status message (CS (DROP)) 2336 to notify the console that the CTIS has dropped the call. In addition, the CIM disconnects 2338 its outbound audio link 2246 to the console from the bus/slot 2224 having audio from the telephone line. Furthermore, the CIM broadcasts a slot assignment (SLA (DROP)) message 2340 to notify the CTIM that the CIM has broken its audio link from the CTIM. The CTIM picks up the slot assignment message and uses it to update their data bases and slot map tables, if necessary.

Figure 26:
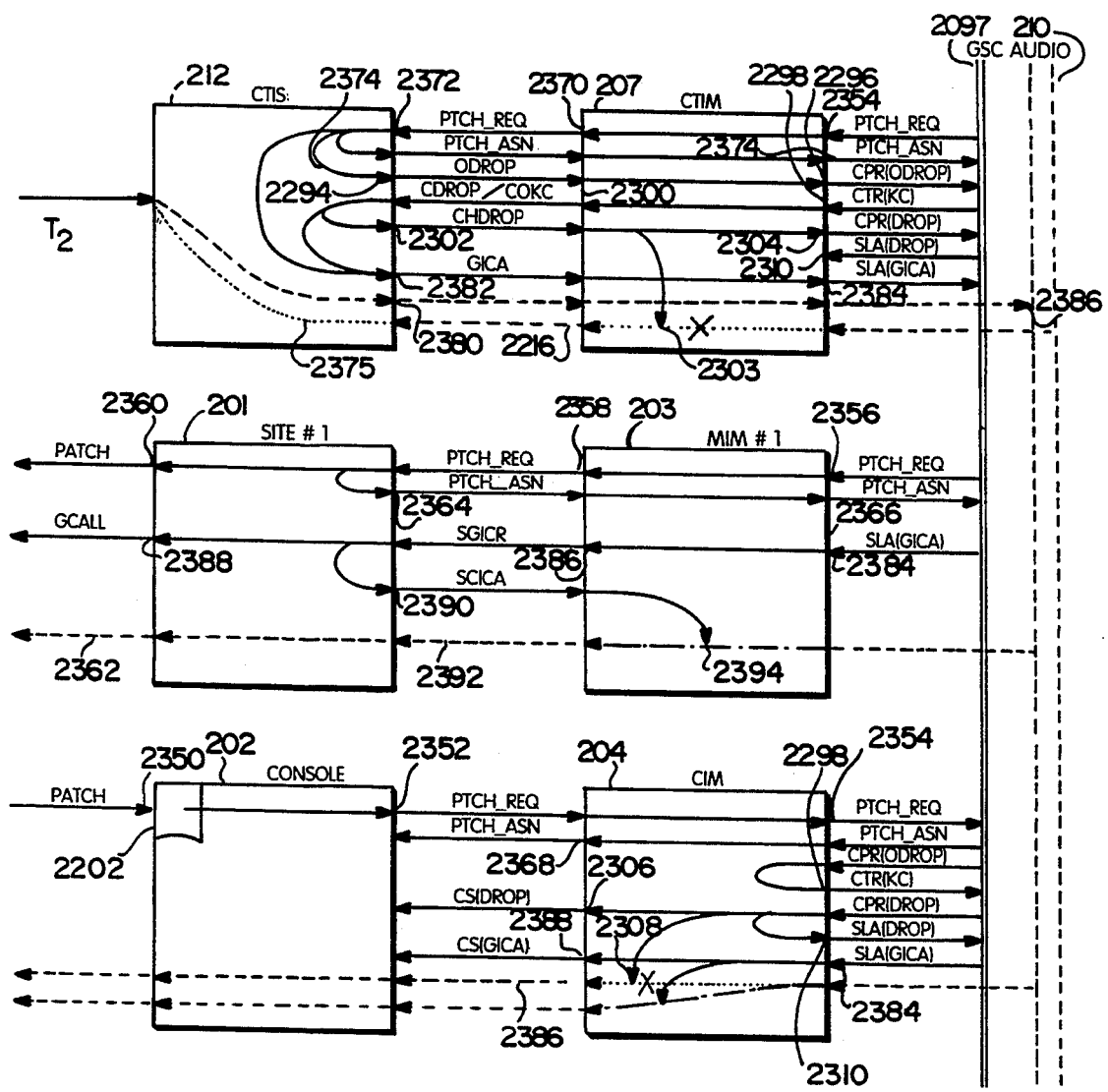

FIG. 26 shows the message and audio routing sequences used by a dispatcher to patch together a telephone call to an individual or group of mobile radio users. This sequence is commenced after the console has executed the origination sequence to establish a bidirectional audio pathway between the console and telephone line. The console operator activates the patch function 2350 on the console 202 which causes the console to send a patch request (consisting of a patch header, patch collection message(s), and a patch active message) (PTCH REQ) message 2352 to the CIM. In response to the patch request message, the CIM broadcasts a patch request message 2354. The CIM patch request message contains much the same information as received from the patch request message from the console. The patch request message broadcast on the message bus 209 is reviewed by all the MIMs 203 and the CTIM 207 in the system. The patch request is addressed to the CTIM and to an individual or one or more user groups. Each MIM determines whether the individual or a member of the identified user group(s) are within its respective site 201. If so, the MIM forwards a patch request message 2358 to the site.

Upon receipt of a patch request message, the site notifies the members of the designated groups of the patch call 2360 via its RF control channel. The site notifies the individual or these group members of the working channel 2362 to which they are to switch to participate in the patch call. In addition, the site returns a patch assignment (PTCH ASN) message 2364 to the MIM that consists of a patch collection acknowledgement and a patch activation acknowledgement messages. The patch assignment message is reformatted and broadcast by the MIM as a patch assignment message 2366 on the message bus. This patch assignment message is addressed to all CIMs, but only the originating CIM initiating the patch will act on it. The originating CIM in response to the patch assignment message 2366 forwards a patch assignment (PTCH ASN) message 2368 to the console, advising the console that at least one of the participating sites to the group call has established the patch call in its site. For group calls, the console and CIM will receive multiple patch assignment messages 2366 from each of the MIMs participating in the patch call. However, the console will act only on the first patch assignment received through the CIM from the first responding MIM.

The CTIM also receives the patch request 2354 from the CIM. In response, the CTIM involved in the patch, i.e., having the telephone line connection, will forward a patch request (PTCH REQ) message 2370 to the CTIS 212. The patch request message contains a patch header having a logical I.D. count of 1 and a field containing the phone connection identifier. This header enables the CTIS to connect the proper telephone line to the patch call.

For a patch, the console first sets up the phone call through CTIS. This means the line, LIX and RIC are assigned and available. Then the console assigns a System Assigned ID (SAID) to every group involved in the patch. The console then sends a patch request, including the SAID, to the CTIS. The CTIS sends back a drop message so that the call originated by the console never really happens, and places a telephone originated call to the SAID it received in the patch request. This is done because it is not possible for a group to place a call to the phone line, but is only possible for a phone user to call the group. When the CTIS "drops" the call, it does not actually disconnect the phone, RIC and LIX. The purpose of the drop is to clear the fake request and send a real request to all the MIMs who have radios involved in the patch.

In response to a patch request, the CTIS performs a patch by dropping the call to/from the console and immediately originating an Inbound CTIS group call to the Patch System Assigned ID (SAID). The CTIS sends a patch assignment (PTCH ASN) message 2372 back to the CTIM consisting of a patch collection acknowledgement and a patch activation acknowledgement messages. The CTIM broadcasts a patch assignment message 2373 containing the same information as in the patch assignment message 2372 message received from the CTIS. In addition, the CTIS sends an originator drop sequence 2374 and drops 2375 the existing call and later switches to the patch call 2380. At this point in the sequence, the steps followed are identical to the originator drop process shown and discussed with respect to FIG. 24. However, once the slot assignment drop message 2310 is received by the CTIM from the CIM, the patch build sequence requires steps in addition to the sequence for an originator drop.

Once the CTIS receives the console drop (CDROP COKC) message 2300 from the CTIM, and after the CTIS generates and sends its channel drop message 3202 back to the CTIM, the CTIS generates a new call from the patched phone line $T_2$ by linking $T_2$ to outbound RIC line 2380 to the CTIM. The CTIS generates and sends a group interconnect channel assignment (GICA) message 2382 sent to the CTIM which in turn sends a slot assignment message (SLA (GICA)) 2384 containing information on the bus/slot 2386 on audio bus 210 that is carrying the audio from the telephone caller for the patch call.

The participating MIMs in the patch call act on this slot assignment message 2384 and send a secondary channel request (SGICR) message 2386 to their sites. Each site broadcasts a group call (GCALL) signal 2388 notifying the radio users in the site of the call and causing them to switch to the working channel 2362, if they have not already done so. In addition, the site sends a secondary channel interconnect channel assignment (SCICA) message 2390 to the MIM informing the MIM of the audio link 2392 between the site and the MIM corresponding to the working channel 2362 for the patch call.

In response to the secondary channel assignment 2390, the MIM links 2394 its audio connection with the site to the bus/slot 2386 carrying the audio from the telephone line $T_2$ and routed to the bus by the CTIS and CTIM. In addition, the slot assignment message 2384 from the CTIM is acted upon by the CIM by rerouting its audio connection 2386 to the console from the bus/slot previously assigned to the incoming telephone line to the bus/slot 2386 now assigned to the patch telephone incoming call. In addition, the CIM sends a call status (CS (GICA)) message 2388 to the console informing the console that the patch call has been established.

The invention has been described in connection with its preferred embodiment. However, the invention is not to be limited to this disclosed embodiment, but covers various modifications and equivalent arrangements included within the spirit and scope of the appended claims.

What is claimed is:

1. In a multisite RF system having a multisite switch routing voice or data communications between a plurality of sites, said switch having a centralized telephone interface module for routing telephone voice or data communications, a centralized telephone interconnect system coupled to said centralized telephone interface module comprising:

a centralized interconnect controller supervising the operation of said centralized telephone interconnect system, said centralized interconnect controller having a data link with said centralized telephone interface module for communicating command messages between said centralized interconnect controller and said centralized telephone interface module, and an audio routing switching center controlled by said centralized interconnect controller, said audio routing switching center comprising a plurality of line interconnect crossbars each coupled to a respective outside telephone line, a plurality of repeater interconnect controllers each coupled to a dedicated audio link with said centralized telephone interface module, and a line interconnect controller selecting one of said line interconnect crossbars and one of said repeater interconnect controllers, and interconnecting a selected one of said line interconnect crossbars with a selected one of said repeater interconnect controllers to establish a voice or data path between a telephone line and said multisite switch, wherein one of said command messages communicated by the centralized interconnect controller to the centralized telephone interface module is a channel assignment message that identifies the selected repeater interconnect controller having an active voice or data communication.

2. A centralized telephone interconnect system as in claim 1 wherein said centralized telephone inter/ace module upon receipt of the channel assignment message broadcasts a multisite channel assignment message on a message bus in the multisite switch.

3. In a multisite RF system having a multisite switch routing voice or data communications between a plurality of sites, said switch having a centralized telephone interface module for routing telephone voice or data communications, a centralized telephone interconnect system coupled to said centralized telephone interface module comprising:

a centralized interconnect controller supervising the operation of said centralized telephone interconnect system, said centralized interconnect controller having a data link with said centralized telephone interface module for communicating command messages between said centralized interconnect controller and said centralized telephone interface module, and an audio routing switching center controlled by said centralized interconnect controller, said audio routing switching center comprising a plurality of line interconnect crossbars each coupled to a respective outside telephone line, a plurality of repeater interconnect controllers each coupled to a dedicated audio link with said centralized telephone interface module, and a line interconnect controller selecting one of said line interconnect crossbars and one of said repeater interconnect controllers, and interconnecting a selected one of said line interconnect crossbars with a selected one of said repeater interconnect controllers to establish a voice or data path between a telephone line and said multisite switch, wherein said centralized telephone interface module sends to the centralized interconnect controller a channel request command identifying one of said audio links to the centralized telephone interface module as carrying a particular voice or data communication, and said centralized interconnect controller upon receipt of said channel request causing the audio routing switching center to connect the selected repeater interconnect controller corresponding to the identified audio link with the selected line interconnect crossbar corresponding to a particular telephone line.

4. A centralized telephone interconnect system as in claim 3 wherein each of said dedicated audio links to said centralized telephone interface module is a continuously open link that sends instantaneously new audio or data communications to said centralized telephone interface module from said audio routing switching center.

* * * * *